(12) United States Patent
Liu et al.

(10) Patent No.: US 12,063,571 B2
(45) Date of Patent: Aug. 13, 2024

(54) POSITIONING METHOD AND APPARATUS

(71) Applicant: Huawei Technologies Co., Ltd., Shenzhen (CN)

(72) Inventors: Qinxin Liu, Shanghai (CN); Yingjie Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 421 days.

(21) Appl. No.: 17/342,101

(22) Filed: Jun. 8, 2021

(65) Prior Publication Data

US 2021/0297817 A1  Sep. 23, 2021

Related U.S. Application Data

(63) Continuation of application No. PCT/CN2019/127095, filed on Dec. 20, 2019.

(30) Foreign Application Priority Data

Dec. 27, 2018 (CN) .......................... 201811613517.2

(51) Int. Cl.
*H04W 4/029* (2018.01)
*G01S 5/02* (2010.01)
*H04W 4/02* (2018.01)

(52) U.S. Cl.
CPC .......... *H04W 4/029* (2018.02); *G01S 5/0273* (2013.01); *H04W 4/025* (2013.01)

(58) Field of Classification Search
CPC ...... H04W 4/029; H04W 4/025; G01S 5/0273
See application file for complete search history.

(56) References Cited

U.S. PATENT DOCUMENTS

| | | | |
|---|---|---|---|
| 2005/0179591 A1* | 8/2005 | Bertoni ..................... | G01S 5/12 342/453 |
| 2012/0289241 A1* | 11/2012 | Kalliola ................... | G01S 5/04 455/456.1 |
| 2014/0087754 A1 | 3/2014 | Siomina et al. | |
| 2014/0274160 A1* | 9/2014 | Xiao ..................... | H04W 64/00 455/456.1 |

(Continued)

FOREIGN PATENT DOCUMENTS

| | | |
|---|---|---|
| CN | 101394672 A | 3/2009 |
| CN | 102045840 A | 5/2011 |

(Continued)

OTHER PUBLICATIONS

3GPP 36455-f00 LPPa (Year: 2018).*

(Continued)

*Primary Examiner* — Ernest G Tacsik
(74) *Attorney, Agent, or Firm* — Leydig, Voit & Mayer, Ltd.

(57) ABSTRACT

A positioning method relating to the field of communications technologies includes: a positioning device obtains a positioning parameter set and sends the positioning parameter set to a positioning center, where the positioning parameter set includes multipath information of a to-be-positioned terminal, and the multipath information is used to position the to-be-positioned terminal. The positioning center may position the to-be-positioned terminal by using the multipath information of the to-be-positioned terminal.

12 Claims, 7 Drawing Sheets

(56) References Cited

U.S. PATENT DOCUMENTS

| | | | | |
|---|---|---|---|---|
| 2015/0195811 A1* | 7/2015 | Wu | ...................... | H04W 4/029 |
| | | | | 455/436 |
| 2015/0219750 A1 | 8/2015 | Xiao et al. | | |
| 2017/0332192 A1* | 11/2017 | Edge | ...................... | H04W 4/02 |
| 2018/0332660 A1* | 11/2018 | Mueck | .................. | H04W 48/10 |
| 2019/0230475 A1* | 7/2019 | Edge | .................... | G01S 5/0236 |
| 2021/0360369 A1* | 11/2021 | Henriksson | ............. | H04W 4/20 |

FOREIGN PATENT DOCUMENTS

| | | | |
|---|---|---|---|
| CN | 103096464 A | | 5/2013 |
| CN | 103582117 A | | 2/2014 |
| CN | 104540099 A | | 4/2015 |
| CN | 104581935 A | | 4/2015 |
| CN | 107135540 A | | 9/2017 |
| CN | 108112071 A | | 6/2018 |
| WO | 2011105946 A1 | | 9/2011 |
| WO | 2014056172 A1 | | 4/2014 |
| WO | WO-2018111254 A1 | * | 6/2018 |

OTHER PUBLICATIONS

"3rd Generation Partnership Project; Technical Specification Group Radio Access Network; Evolved Universal Terrestrial Radio Access Network (E UTRAN); Stage 2 functional specification of User Equipment (UE) positioning in E-UTRAN (Release 15)," 3GPP TS 36.305, V15.1.0, XP051487411, total 87 pages, 3rd Generation Partnership Project, Valbonne, France (Sep. 2018).

* cited by examiner

POSITIONING METHOD AND APPARATUS

CROSS-REFERENCE TO RELATED APPLICATIONS

This application is a continuation of International Application No. PCT/CN2019/127095, filed on Dec. 20, 2019, which claims priority to Chinese Patent Application No. 201811613517.2, filed on Dec. 27, 2018. The disclosures of the aforementioned applications are hereby incorporated by reference in their entireties.

TECHNICAL FIELD

This application relates to the field of communications technologies, and in particular, to a positioning method and apparatus.

BACKGROUND

With rapid development of communications technologies, a communications network puts forward a higher requirement for precision of positioning a terminal. Currently, a base station may position a terminal by using an angle of arrival (AOA) and a timing advance (TA). The TA may be obtained by the terminal and the base station through joint measurement, or may be obtained by the base station through separate measurement. An advantage of this positioning method is that positioning can be implemented by using a single base station, and positioning can still be implemented when the terminal does not support a positioning function.

For example, the base station and the terminal are on a same horizontal plane. As shown in FIG. 1, the base station calculates a distance R (R=TA×C/2, where C is speed of light) between the terminal and the base station by using a measured TA, and then determines a location of the terminal based on a measured AOA (namely, $\alpha$ in FIG. 1). It may be understood that the terminal is located at an intersection point of a ray that uses the base station as an endpoint and whose included angle with a due north direction is a and a circumference that uses the base station as a center and uses R as a radius. When the terminal is in a line-of-sight (LOS) environment, positioning precision of the positioning method usually meets a requirement. However, when the terminal is in a non-line-of-sight (NLOS) environment, as shown in FIG. 2, the base station usually determines an included angle between a direction with maximum received signal energy and the due north direction as an AOA (namely, $\alpha$ in FIG. 2). First, the AOA is not an actual included angle between a ray in a direction from the base station to the terminal and the due north direction. In addition, the TA obtained by the base station is a time difference calculated after a signal is reflected between the base station and the terminal, and is not a time difference calculated after the signal is directly transmitted between the base station and the terminal. In this case, when the terminal is positioned based on the foregoing positioning method, a positioned location of the terminal is at a point B, but actually, a location of the terminal is at a point A. It may be learned that, when the terminal is in the NLOS environment, positioning precision is not high when the terminal is positioned by using the foregoing method.

Through statistics collection, in the foregoing positioning method, a probability that an error of $\alpha$ is less than 5° when the terminal is in the LOS environment is 95%, and a probability that the error of a is less than 18.6° when the terminal is in the NLOS environment is only 67%. In other words, when the terminal is in the NLOS environment, when the terminal is positioned by using the foregoing method, precision of positioning the terminal cannot be used in a scenario with a relatively high positioning requirement.

SUMMARY

Embodiments of this application provide a positioning method and apparatus, to improve precision of positioning a terminal.

Technical solutions which achieve the foregoing objective are provided in this application.

According to a first aspect, a positioning method is provided, and includes: A positioning device obtains a positioning parameter set and sends the positioning parameter set to a positioning center, where the positioning parameter set includes multipath information of a to-be-positioned terminal, and the multipath information is used to position the to-be-positioned terminal. In the method provided in the first aspect, the positioning device may send the multipath information of the to-be-positioned terminal to the positioning center, so that the positioning center may position the to-be-positioned terminal by using the multipath information of the to-be-positioned terminal. Compared with positioning the to-be-positioned terminal by using single-path information (in other words, a measurement value corresponding to one NLOS path), when the to-be-positioned terminal is positioned by using the multipath information, the to-be-positioned terminal can be positioned more accurately.

In a possible implementation, the multipath information includes a measurement value corresponding to each path in a plurality of different paths, the plurality of different paths are a plurality of different transmission paths along which a reference signal sent by the to-be-positioned terminal arrives at the positioning device, the measurement value corresponding to each path includes a measurement value obtained by the positioning device by measuring a reference signal transmitted on the path, and the measurement value includes one or more of a measurement value of an azimuth angle of arrival, a measurement value of a zenith angle of arrival, a measurement value of time of arrival, or a measurement value of an angle of arrival. In this possible implementation, there may be a plurality of implementations of information included in the measurement value, thereby improving flexibility of using the positioning method.

In a possible implementation, the plurality of different paths are a plurality of different transmission paths along which one reference signal sent by the to-be-positioned terminal arrives at the positioning device; the plurality of different paths are a plurality of different transmission paths along which one reference signal sent by the to-be-positioned terminal at different time points arrives at the positioning device; or the plurality of different paths are a plurality of different transmission paths along which a plurality of reference signals sent by the to-be-positioned terminal arrive at the positioning device. In this possible implementation, multipath may have a plurality of meanings, so that the terminal can be positioned in different scenarios by using the positioning method provided in this application.

In a possible implementation, the positioning parameter set further includes one or more of longitude information of the to-be-positioned terminal, latitude information of the to-be-positioned terminal, or equivalent LOS path information of the to-be-positioned terminal. The equivalent LOS path information of the to-be-positioned terminal includes one or more of an azimuth angle of arrival of an equivalent LOS path, a zenith angle of arrival of an equivalent LOS path, time of arrival of an equivalent LOS path, or an angle of arrival of an equivalent LOS path that is calculated based on the multipath information. In this possible implementation, the positioning parameter set may further include one or more of the longitude information of the to-be-positioned terminal, the latitude information of the to-be-positioned terminal, or the equivalent LOS path information of the to-be-positioned terminal. The information may further assist the positioning center in positioning, to improve precision of positioning the terminal.

In a possible implementation, the method further includes: The positioning device receives a positioning information measurement request from the positioning center, where the positioning information measurement request is used to request the positioning device to obtain the positioning parameter set.

In a possible implementation, the positioning parameter set is carried in an NR positioning protocol annex (NRPPa) message or an evolved serving mobile location center location measurement unit application protocol (SLmAP) message.

According to a second aspect, a positioning apparatus is provided, and the positioning apparatus has a function of implementing any method provided in the first aspect. The function may be implemented by hardware, or may be implemented by hardware by executing corresponding software. The hardware or the software includes one or more units corresponding to the foregoing function. The positioning apparatus may exist in a product form of a chip.

According to a third aspect, a positioning method is provided, and includes: A positioning center receives a positioning parameter set including multipath information of a to-be-positioned terminal from a positioning device, and returns a response to the positioning device, where the multipath information is used to position the to-be-positioned terminal, and the response is used to indicate that the positioning center receives the positioning parameter set. In the method provided in the third aspect, the positioning center may receive the multipath information of the to-be-positioned terminal from the positioning device, and position the to-be-positioned terminal by using the multipath information of the to-be-positioned terminal. Compared with positioning the to-be-positioned terminal by using single-path information (in other words, a measurement value corresponding to one NLOS path), when the to-be-positioned terminal is positioned by using the multipath information, the to-be-positioned terminal can be positioned more accurately.

In a possible implementation, the multipath information includes a measurement value corresponding to each path in a plurality of different paths, the plurality of different paths are a plurality of different transmission paths along which a reference signal sent by the to-be-positioned terminal arrives at the positioning device, the measurement value corresponding to each path includes a measurement value obtained by the positioning device by measuring a reference signal transmitted on the path, and the measurement value includes one or more of a measurement value of an azimuth angle of arrival, a measurement value of a zenith angle of arrival, a measurement value of time of arrival, or a measurement value of an angle of arrival. In this possible implementation, there may be a plurality of implementations of information included in the measurement value, thereby improving flexibility of using the positioning method.

In a possible implementation, the plurality of different paths are a plurality of different transmission paths along which one reference signal sent by the to-be-positioned terminal arrives at the positioning device; the plurality of different paths are a plurality of different transmission paths along which one reference signal sent by the to-be-positioned terminal at different time points arrives at the positioning device; or the plurality of different paths are a plurality of different transmission paths along which a plurality of reference signals sent by the to-be-positioned terminal arrive at the positioning device. In this possible implementation, multipath may have a plurality of meanings, so that the terminal can be positioned in different scenarios by using the positioning method provided in this application.

In a possible implementation, the positioning parameter set further includes one or more of longitude information of the to-be-positioned terminal, latitude information of the to-be-positioned terminal, or equivalent LOS path information of the to-be-positioned terminal. The equivalent LOS path information of the to-be-positioned terminal includes one or more of an azimuth angle of arrival of an equivalent LOS path, a zenith angle of arrival of an equivalent LOS path, time of arrival of an equivalent LOS path, or an angle of arrival of an equivalent LOS path that is calculated based on the multipath information. In this possible implementation, the positioning parameter set may further include one or more of the longitude information of the to-be-positioned terminal, the latitude information of the to-be-positioned terminal, or the equivalent LOS path information of the to-be-positioned terminal. The information may further assist the positioning center in positioning, to improve precision of positioning the terminal.

In a possible implementation, the method further includes: The positioning center sends a positioning information measurement request to the positioning device, where the positioning information measurement request is used to request the positioning device to obtain the positioning parameter set.

In a possible implementation, the positioning parameter set is carried in an NRPPa message or an SLmAP message.

In a possible implementation, the positioning center sends indication information to an access network device, where the indication information is used to indicate the to-be-positioned terminal to send N reference signals, the access network device is an access network device accessed by the to-be-positioned terminal, and N is an integer greater than 1.

According to a fourth aspect, a positioning apparatus is provided, and the positioning apparatus has a function of implementing any method provided in the third aspect. The function may be implemented by hardware, or may be implemented by hardware by executing corresponding software. The hardware or the software includes one or more units corresponding to the foregoing function. The positioning apparatus may exist in a product form of a chip.

According to a fifth aspect, a positioning method is provided, and includes: An access network device receives indication information from a positioning center, where the indication information is used to indicate a to-be-positioned terminal to send N reference signals, the access network device is an access network device accessed by the to-be-positioned terminal, and N is an integer greater than 1; and the access network device sends configuration information to the to-be-positioned terminal according to the indication information, where the configuration information is used to configure, for the to-be-positioned terminal, a resource for sending the N reference signals, and the N reference signals are used to position the to-be-positioned terminal. According to the method provided in the fifth aspect, a terminal may be positioned by using N reference signals.

In a possible implementation, time domain resources in the resource that is configured for the to-be-positioned terminal in the configuration information for sending the N reference signals are the same; or time domain resources in the resource that is configured for the to-be-positioned terminal in the configuration information for sending the N reference signals are different.

According to a sixth aspect, a positioning apparatus is provided, and includes a transceiver unit and a processing unit. The processing unit is configured to receive indication information from a positioning center by using the transceiver unit, where the indication information is used to indicate a to-be-positioned terminal to send N reference signals, the positioning apparatus is an access network device accessed by the to-be-positioned terminal, and N is an integer greater than 1. The processing unit is further configured to: send configuration information to the to-be-positioned terminal according to the indication information by using the transceiver unit, where the configuration information is used to configure, for the to-be-positioned terminal, a resource for sending the N reference signals, and the N reference signals are used to position the to-be-positioned terminal.

In a possible implementation, time domain resources in the resource that is configured for the to-be-positioned terminal in the configuration information for sending the N reference signals are the same; or time domain resources in the resource that is configured for the to-be-positioned terminal in the configuration information for sending the N reference signals are different.

According to a seventh aspect, a positioning method is provided, and includes: A to-be-positioned terminal receives configuration information from an access network device, where the configuration information is used to configure, for the to-be-positioned terminal, a resource for sending N reference signals, and the N reference signals are used to position the to-be-positioned terminal; and the to-be-positioned terminal sends the N reference signals based on the configuration information. According to the method provided in the seventh aspect, a terminal may be positioned by using N reference signals.

In a possible implementation, time domain resources in the resource that is configured for the to-be-positioned terminal in the configuration information for sending the N reference signals are the same, and that the to-be-positioned terminal sends the N reference signals based on the configuration information includes: The to-be-positioned terminal simultaneously sends the N reference signals based on the configuration information.

In a possible implementation, time domain resources in the resource that is configured for the to-be-positioned terminal in the configuration information for sending the N reference signals are different, and that the to-be-positioned terminal sends the N reference signals based on the configuration information includes: The to-be-positioned terminal sends the N reference signals on different time domain resources based on the configuration information.

According to an eighth aspect, a positioning apparatus is provided, and includes a transceiver unit and a processing unit. The processing unit is configured to receive configuration information from an access network device by using the transceiver unit, where the configuration information is used to configure, for the positioning apparatus, a resource for sending N reference signals, and the N reference signals are used to position the positioning apparatus. The processing unit is further configured to send the N reference signals based on the configuration information by using the transceiver unit.

In a possible implementation, time domain resources in the resource that is configured for the to-be-positioned terminal in the configuration information for sending the N reference signals are the same, and the processing unit is specifically configured to: simultaneously send the N reference signals based on the configuration information by using the transceiver unit.

In a possible implementation, time domain resources in the resource that is configured for the to-be-positioned terminal in the configuration information for sending the N reference signals are different, and the processing unit is specifically configured to: send the N reference signals based on the configuration information on different time domain resources by using the transceiver unit.

According to a ninth aspect, a positioning apparatus is provided, where the positioning apparatus includes a memory and a processor, and optionally, further includes at least one communications interface and a communications bus. The memory is configured to store computer-executable instructions, and the processor, the memory, and the at least one communications interface are connected by using the communications bus. The processor executes the computer-executable instructions stored in the memory, so that the positioning apparatus implements any method provided in any one of the first aspect, the third aspect, the fifth aspect, and the seventh aspect. The apparatus may exist in a product form of a chip.

According to a tenth aspect, a communications system is provided, and includes the positioning apparatuses provided in the second aspect and the fourth aspect.

According to an eleventh aspect, a computer-readable storage medium is provided, and includes instructions, and when the instructions are run on a computer, the computer is enabled to perform any method provided in any one of the first aspect, the third aspect, the fifth aspect, and the seventh aspect.

According to a twelfth aspect, a computer program product including instructions is provided, when the computer program product is run on a computer, the computer is enabled to perform any method provided in any one of the first aspect, the third aspect, the fifth aspect, and the seventh aspect.

For technical effects brought by any design manner in the second aspect, the fourth aspect, the sixth aspect, the eighth aspect, and the ninth aspect to the twelfth aspect, refer to technical effects brought by corresponding design manners in the first aspect, the third aspect, the fifth aspect, and the seventh aspect. Details are not described herein again.

It should be noted that, all possible implementations of any one of the foregoing aspects may be combined without a contradiction in the solutions.

DESCRIPTION OF EMBODIMENTS

Figure 1:
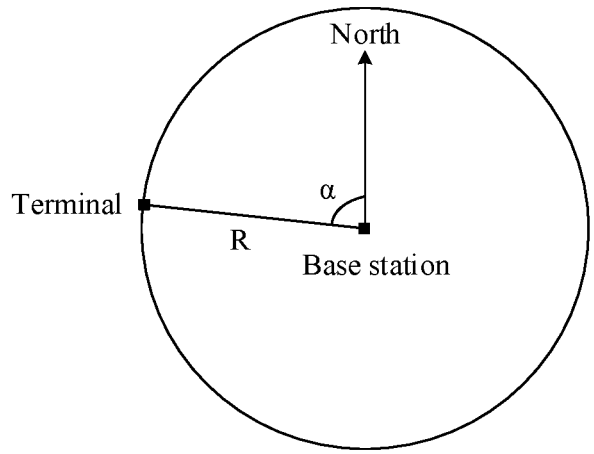
FIG. 1 is a schematic diagram of locations of a terminal and a base station according to an embodiment of this application.

The following describes technical solutions in embodiments of this application with reference to the accompanying drawings. In the descriptions of this application, unless otherwise stated, "/" represents "or", for example, A/B may represent A or B. The term "and/or" in this specification describes only an association relationship for associated objects and represents that three relationships may exist. For example, A and/or B may represent the following three cases: Only A exists, both A and B exist, and only B exists. In addition, in the descriptions of this application, "a plurality of" means two or more than two. In embodiments of this application, "including one or more of A or B" may represent three cases: including A, including A and B, and including B. In the embodiments of this application, "including one or more of A, B, or C" may represent seven cases: including A, B, and C, including A and B, including A and C, including B and C, including A, including B, and including C.

In addition, for ease of clearly describing technical solutions in embodiments of this application, words such as "first" and "second" are used to distinguish between items. A person skilled in the art may understand that words such as "first" and "second" do not limit a quantity and an execution order, and the words such as "first" and "second" do not limit an absolute difference.

Technical solutions in embodiments of this application may be applied to various communications systems, for example, orthogonal frequency division multiple access (OFDMA), single carrier frequency division multiple access (SC-FDMA), and another system. The terms "system" and "network" can be interchanged with each other. An OFDMA system may implement wireless technologies such as evolved universal terrestrial radio access (E-UTRA) and ultra mobile broadband (UMB). The E-UTRA is an evolved version of a universal mobile telecommunications system (UMTS). A 3rd generation partnership project (3GPP) is a new version that uses the E-UTRA in long term evolution (LTE) and various versions evolved based on LTE. A fifth-generation (5th generation mobile networks or 5th generation wireless systems, 5G) communications system and new radio (NR) are next-generation communications systems that are being studied. The 5G communications system includes a non-standalone (NSA) 5G communications system, a standalone (SA) 5G communications system, or an NSA 5G communications system and an SA 5G communications system. In addition, the communications systems may be further applicable to a future-oriented communications technology, and all the communications systems are applicable to the technical solutions provided in the embodiments of this application.

A positioning device in embodiments of this application may be a location measurement unit (LMU). The LMU may be configured to measure positioning information of a terminal, and may further be configured to position the terminal. The LMU may be an independent network element, or may be integrated into another network device, for example, integrated into an access network device. In this case, the positioning device below is an access network device. The access network device may be an apparatus deployed in a radio access network (RAN) to provide a wireless communication function for the terminal, for example, may be a base station. The access network device may include a macro base station, a micro base station (also referred to as a small cell), a relay station, an access point (AP), or the like in various forms, or may include various control nodes, such as a network controller. The control node may be connected to a plurality of base stations, and configure resources for a plurality of terminals covered by the plurality of base stations. In systems that use different wireless access technologies, names of devices that have a base station function may be different. For example, in LTE, a base station is referred to as an evolved NodeB (eNB or eNodeB), and in a 5G communications system, a base station is referred to as a next-generation node base station (gNB). A specific name of the base station is not limited in this application.

The terminal device in the embodiments of this application may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal may be a drone, an internet of things (IoT) device, a station (ST) in a wireless local area network (WLAN), a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, or a wearable device (may also be referred to as a wearable intelligent device). The terminal may be alternatively a terminal in a next-generation communications system, for example, a terminal in the 5G communications system or a terminal in a future evolved public land mobile network (PLMN), or a terminal in an NR communications system.

A positioning center in the following embodiments of this application is mainly configured to determine a location of the terminal, obtain uplink location measurement from the access network device, and obtain non-terminal related auxiliary information from the access network device, and the like. The positioning center may further perform integrated positioning on one terminal based on location measurement reported by a plurality of access network devices. For example, the positioning center may be a location management function (LMF) or an evolved serving mobile location center (E-SMLC).

The method provided in the embodiments of this application may be applied to but is not limited to the following scenarios: an outdoor enhanced mobile broadband (eMBB) scenario, an indoor eMBB scenario, an ultra-reliable and low-latency communication (URLLC) scenario, a massive machine type communications (mMTC) scenario, and an internet of things (IOT) scenario.

Figure 3:
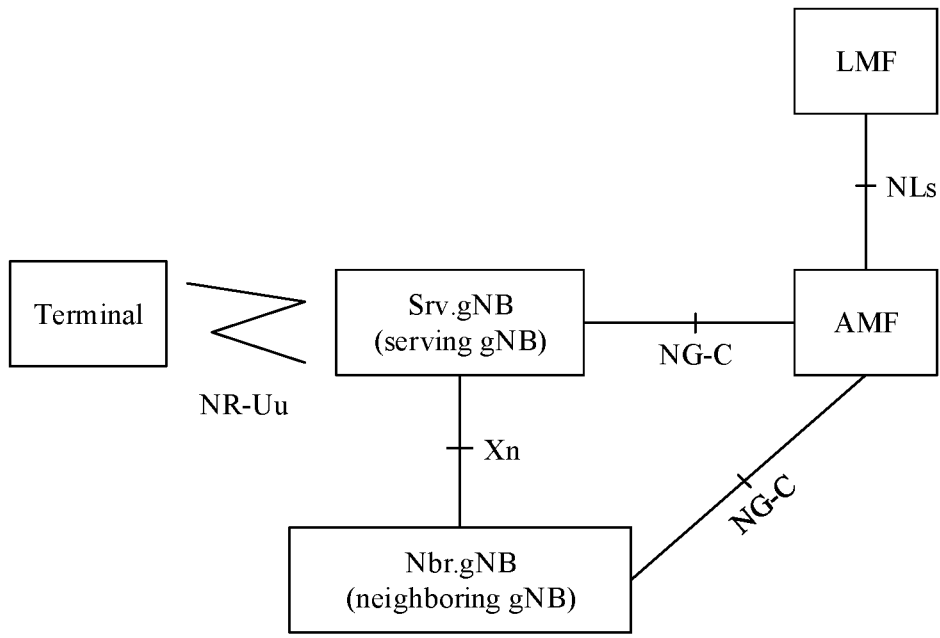
FIG. 3 and FIG. 4 are respectively schematic diagrams of a network architecture according to an embodiment of this application.
Figure 4:
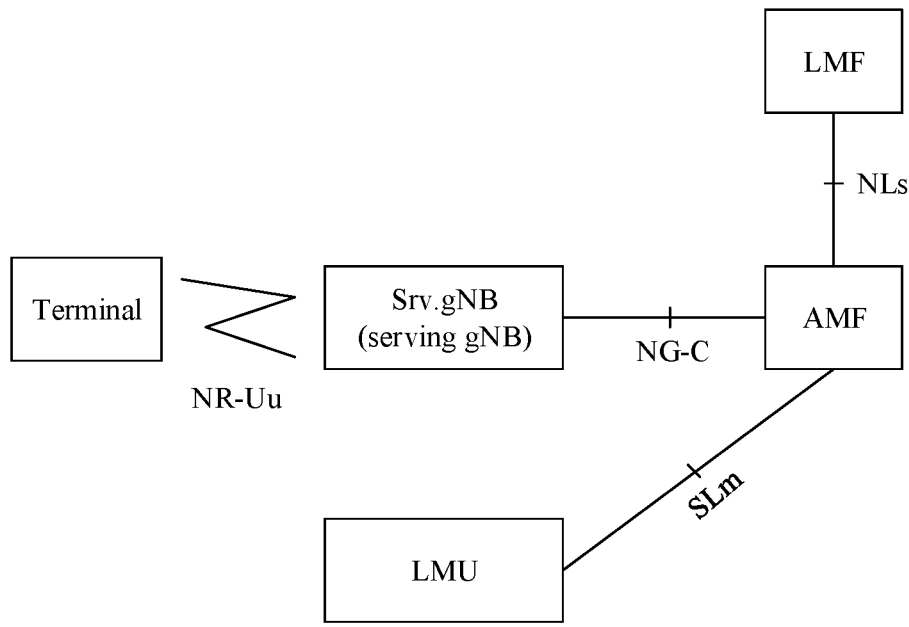

When a method provided in embodiments of this application is applied to a 5G communications system, FIG. 3 and FIG. 4 respectively show example network architectures to which the method may be applied.

In the network architecture shown in FIG. 3, a positioning device is a gNB, and a positioning center is an LMF. The network architecture includes a terminal, a serving base station (namely, Srv.gNB in FIG. 3, where Srv.gNB refers to a serving gNB) of the terminal, a neighboring base station (namely, Nbr.gNB in FIG. 3, where Nbr.gNB refers to a neighbor gNB) of the serving base station, an access and mobility management function (AMF), and the LMF. A message between the LMF and the serving base station may be an NR positioning protocol annex (NRPPa) message.

In the network architecture shown in FIG. 4, a positioning device is an independent LMU, and a positioning center is an LMF. The network architecture includes a terminal, a serving base station (namely, Srv.gNB in FIG. 4), a location measurement unit (LMU), an AMF, and the LMF. A message name of a message between the LMF and the LMU may follow a message name in 4G, or may be a message name newly defined in a future 5G communications network.

A system architecture and a service scenario described in embodiments of this application are intended to describe technical solutions in embodiments of this application more clearly, and do not constitute a limitation on technical solutions provided in embodiments of this application. It will be appreciated that, with evolution of a network architecture and emergence of a new service scenario, technical solutions provided in embodiments of this application are also applicable to a similar technical problem. In embodiments of this application, that the provided method is applied to the NR communications system or the 5G communications system is used as an example for description. However, it should be noted that the method provided in the embodiments of this application may also be applied to another network. For example, the method may be applied to an LTE system. When the method provided in the embodiments of this application is applied to the LTE system, a network node that performs the method provided in the embodiments of this application may be replaced with a network node in the LTE system. For example, in FIG. 3 and FIG. 4, the gNB is replaced with an eNB, the LMF is replaced with an E-SMLC, and the AMF is replaced with an MME. In this case, the message between the LMF and the LMU may be an evolved serving mobile location center location measurement unit (E-SMLC-LMU) application protocol (SLmAP) message. The message between the LMF and the eNB may be an LTE positioning protocol annex (LPPa) message.

To make embodiments of this application clearer, the following briefly describes some concepts mentioned in embodiments of this application.

1. LOS and NLOS

Figure 2:
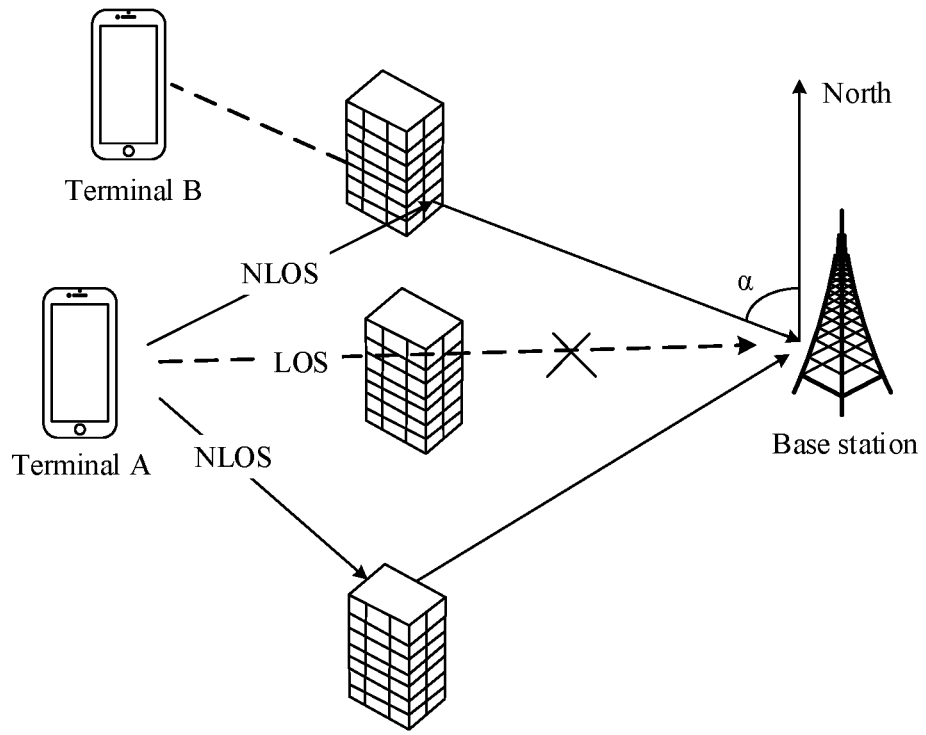
FIG. 2 is a schematic diagram of a propagation path of a signal sent by a terminal according to an embodiment of this application.

Propagation conditions of a wireless communications system are classified into an LOS environment and an NLOS environment. In the LOS environment, a radio signal is propagated in a straight line between a transmit end and a receive end without being blocked. In this case, a transmission path of the radio signal may be referred to as an LOS path or a direct path. In the NLOS environment, a radio signal is blocked (for example, blocked by a house). In this case, a signal sent by a transmit end cannot be directly transmitted to a receive end, but may be transmitted to the receive end through reflection (or refraction or scattering or diffraction) of another object (for example, a tree). In other words, the radio signal is not propagated in a straight line between the transmit end and the receive end. In this case, a transmission path of the radio signal may be referred to as an NLOS path. For ease of description, in the embodiments of this application, an object that reflects, refracts, scatters, or diffracts the radio signal is referred to as a reflector. For details, refer to FIG. 2 for understanding.

2. AOA, Azimuth Angle of Arrival (AAOA), Zenith Angle of Arrival (ZAOA)

Figure 5:
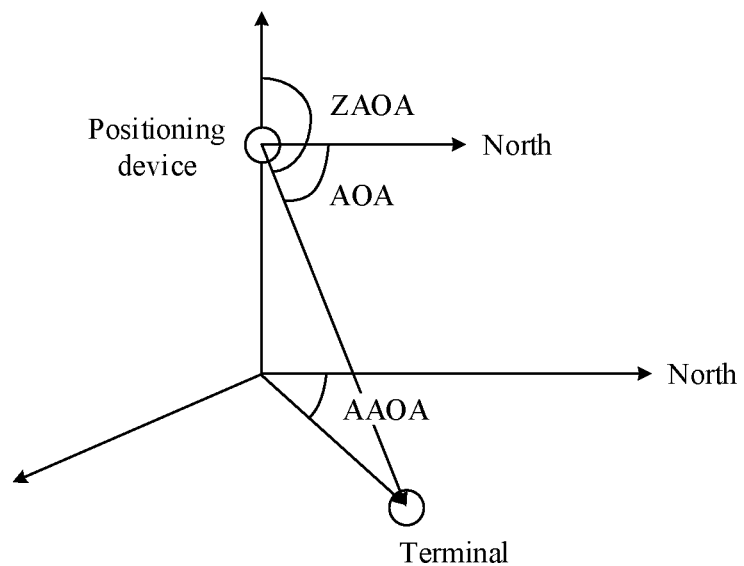
FIG. 5 and FIG. 6 are respectively schematic diagrams of different types of positioning angles according to an embodiment of this application.

As shown in FIG. 5, an AOA of an LOS path is an included angle between a due north direction and a connection line from a positioning device to a terminal. An AAOA of the LOS path is an included angle between the due north direction and a horizontal projection of the connection line from the positioning device to the terminal. A ZAOA of the LOS path is a complementary angle of an included angle between a vertical projection of the connection line from the positioning device to the terminal and the connection line from the positioning device to the terminal, in other words, an included angle between a zenith direction and the connection line from the positioning device to the terminal.

Figure 6:
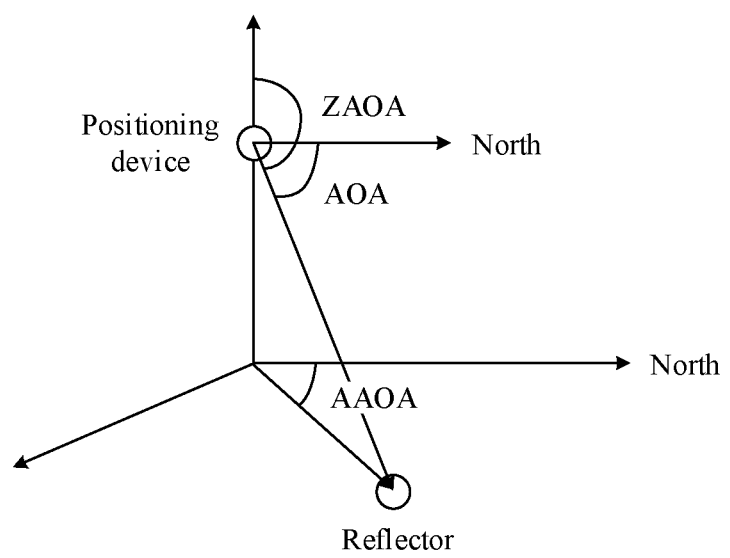

As shown in FIG. 6, an AOA of an NLOS path is an included angle between a due north direction and a connection line from a positioning device to a reflector. An AAOA of the NLOS path is an included angle between the due north direction and a horizontal projection of the connection line from the positioning device to the reflector. A ZAOA of the NLOS path is a complementary angle of an included angle between a vertical projection of the connection line from the positioning device to the reflector and the connection line from the positioning device to the reflector, in other words, an included angle between a zenith direction and the connection line from the positioning device to the reflector.

For positive and negative values of the AOA, the AAOA, and the ZAOA, there may be the following definitions: A counterclockwise direction is positive and a clockwise direction is negative; or a clockwise direction is positive and a counterclockwise direction is negative. This is not specifically limited in the embodiments of this application. A measurement method of the AOA, the AAOA, and the ZAOA is well-known to a person skilled in the art. The AOA, the AAOA, and the ZAOA are all used for positioning the terminal in the embodiments of this application. Therefore, the AOA, the AAOA, and the ZAOA may also be collectively referred to as a positioning angle, and the AOA, the AAOA, and the ZAOA may be considered as three different types of positioning angles.

It should be noted that the AAOA may also be referred to as a horizontal angle of arrival (HAOA), and the ZAOA may also be referred to as a vertical angle of arrival (VAOA).

3. Time of Arrival (TOA)

The TOA is transmission time of a radio signal from a transmit end to a receive end. A measurement method of the TOA is well-known to a person skilled in the art.

If the transmit end is a terminal and the receive end is an access network device (for example, a base station), the TOA herein may be further understood as uplink relative time of arrival (UL RTOA) measured by the access network device, and the UL RTOA is a measurement amount defined in existing uplink time difference of arrival (UTDOA) positioning.

4. Equivalent LOS Path

The equivalent LOS path is a concept for a terminal in the NLOS environment. The equivalent LOS path is a signal transmission path when it is assumed that there is no blocking between the terminal in the NLOS environment and the positioning device. Parameters such as an AOA, an AAOA, a TOA, and a ZAOA of the equivalent LOS path may be calculated based on multipath information. The equivalent LOS path may be represented by using one or more pieces of information such as the AOA, the AAOA, the TOA, and the ZAOA of the equivalent LOS path and a distance that is calculated based on the TOA.

Figure 7:
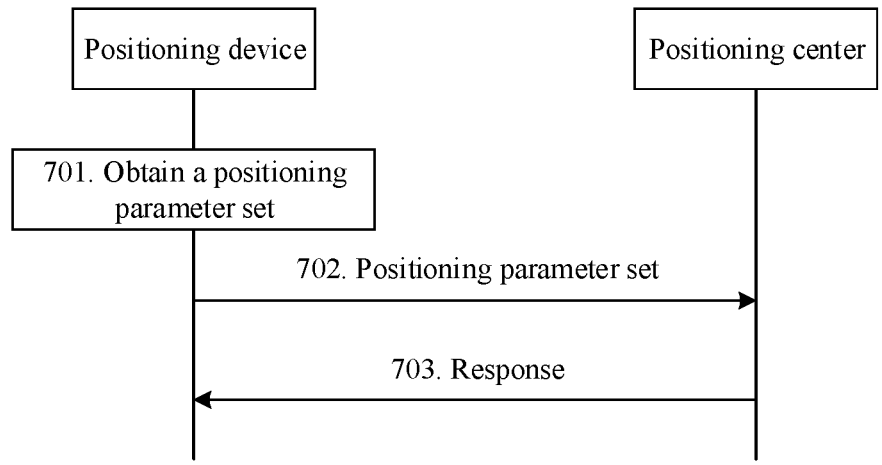
FIG. 7 is an interaction flowchart of a positioning method according to an embodiment of this application.

An embodiment of this application provides a positioning method. As shown in FIG. 7, the method includes the following steps.

701. A positioning device obtains a positioning parameter set, where the positioning parameter set includes multipath information of a to-be-positioned terminal, and the multipath information is used to position the to-be-positioned terminal.

The positioning device may be an independent LMU, or may be an access network device. The access network device may be an access network device accessed by the to-be-positioned terminal, or may be another access network device (for example, an access network device adjacent to an access network device accessed by the to-be-positioned terminal).

The multipath information is positioning information respectively corresponding to a plurality of different paths that is obtained by the positioning device by measuring a reference signal sent by the to-be-positioned terminal and transmitted on a plurality of different paths. The plurality of different paths may be a plurality of different NLOS paths, or may be one LOS path and at least one NLOS path.

The reference signal sent by the to-be-positioned terminal may be one reference signal, or may be a plurality of reference signals. The plurality of reference signals may be simultaneously sent or may not be simultaneously sent.

Specifically, the plurality of different paths are a plurality of different transmission paths along which one reference signal sent by the to-be-positioned terminal arrives at the positioning device; the plurality of different paths are a plurality of different transmission paths along which one reference signal sent by the to-be-positioned terminal at different time points arrives at the positioning device; or the plurality of different paths are a plurality of different transmission paths along which a plurality of reference signals sent by the to-be-positioned terminal arrive at the positioning device.

The reference signal may be a sounding reference signal (SRS).

Optionally, the multipath information includes a measurement value corresponding to each path in a plurality of different paths, the plurality of different paths are a plurality of different transmission paths along which a reference signal sent by the to-be-positioned terminal arrives at the positioning device, the measurement value corresponding to each path includes a measurement value obtained by the positioning device by measuring a reference signal transmitted on the path, and the measurement value includes one or more of a measurement value of an azimuth angle of arrival (in other words, the foregoing AAOA), a measurement value of a zenith angle of arrival (in other words, the foregoing ZAOA), a measurement value of time of arrival (in other words, the foregoing TOA), or a measurement value of an angle of arrival (in other words, the foregoing AOA).

The AOA measurement value, the AAOA measurement value, and the ZAOA measurement value are respectively in a one-to-one correspondence with the TOA measurement value. A measurement method of the multipath information is well-known to a person skilled in the art.

For example, it is assumed that the plurality of different paths are five different paths. For the multipath information, refer to Table 1. AOAx represents an AOA measurement value corresponding to an $x^{th}$ path, AAOAx represents an AAOA measurement value corresponding to the $x^{th}$ path, ZAOAx represents a ZAOA measurement value corresponding to the $x^{th}$ path, and TOAx represents a TOA measurement value corresponding to the $x^{th}$ path, where x is an integer greater than or equal to 1 and less than or equal to 5. The multipath information may be sorted in ascending order of TOA measurement values or in descending order of TOA measurement values, and certainly may be sorted based on measurement values of another angle. These are not listed one by one herein.

TABLE 1

| Path | Measurement value corresponding to the path (one or more of the following measurement values) |
| --- | --- |
| 1 | AOA1, AAOA1, ZAOA1, TOA1 |
| 2 | AOA2, AAOA2, ZAOA2, TOA2 |
| 3 | AOA3, AAOA3, ZAOA3, TOA3 |
| 4 | AOA4, AAOA4, ZAOA4, TOA4 |
| 5 | AOA5, AAOA5, ZAOA5, TOA5 |

Optionally, the positioning parameter set further includes one or more of longitude information of the to-be-positioned terminal, latitude information of the to-be-positioned terminal, or equivalent LOS path information of the to-be-positioned terminal. The equivalent LOS path information of the to-be-positioned terminal includes one or more of an azimuth angle of arrival of an equivalent LOS path, a zenith angle of arrival of an equivalent LOS path, time of arrival of an equivalent LOS path, or an angle of arrival of an equivalent LOS path that is calculated based on the multipath information.

It should be noted that, when the terminal is in the NLOS environment, although a radio signal between the terminal and the positioning device does not have an unblocked LOS path propagation environment, an AOA of the LOS path may still be calculated based on the multipath information. In this case, the AOA of the LOS path is not calculated based on a reference signal actually transmitted on the LOS path. Therefore, in this embodiment of this application, the AOA of the LOS path that is calculated based on the multipath information is referred to as an AOA of an equivalent LOS path. An AAOA of the equivalent LOS path, a ZAOA of the equivalent LOS path, and a TOA of the equivalent LOS path are similar to this. Details are not described again.

702. The positioning device sends the positioning parameter set to a positioning center. Correspondingly, the positioning center receives the positioning parameter set from the positioning device.

Optionally, the positioning parameter set is carried in an NRPPa message, an SLmAP message, or another message (for example, an LPPa message).

Specifically, when the positioning parameter set is carried in an NRPPa message, the positioning device may be an access network device, or when the positioning parameter set is carried in an SLmAP message, the positioning device may be an LMU. The NRPPa message or the SLmAP message may alternatively have another name. This is not specifically limited in this embodiment of this application.

It should be noted that the positioning center may receive a positioning parameter set sent by one positioning device, or may receive positioning parameter sets sent by a plurality of positioning devices. This is not specifically limited in this embodiment of this application.

703. The positioning center returns a response to the positioning device, where the response is used to indicate that the positioning center successfully receives the positioning parameter set.

Optionally, after step 703, the method further includes: The positioning device receives the response from the positioning center. After receiving the response, the positioning device may determine, based on the response, that the positioning center successfully receives the positioning parameter set.

After the positioning center receives the positioning parameter set, if the positioning parameter set includes only the multipath information, the positioning center may determine location information of the to-be-positioned terminal based on the multipath information in a manner 1 or a manner 2 described below. When the positioning parameter set further includes one or more of longitude and latitude information or equivalent LOS path information of the to-be-positioned terminal, any one piece of information in the longitude and latitude information and the equivalent LOS path information of the to-be-positioned terminal may represent the location information of the to-be-positioned terminal, and the positioning center directly obtains the location information of the to-be-positioned terminal based on the positioning parameter set. Certainly, the positioning center may also obtain more accurate location information of the to-be-positioned terminal by averaging (or performing weighted averaging on) latitude and longitude information (or equivalent LOS path information) of the to-be-positioned terminal that is measured by a plurality of positioning devices.

In the method provided in this embodiment of this application, the positioning device may send the multipath information of the to-be-positioned terminal to the positioning center, so that the positioning center may position the to-be-positioned terminal by using the multipath information of the to-be-positioned terminal. Compared with positioning the to-be-positioned terminal by using single-path information (in other words, a measurement value corresponding to one NLOS path), when the to-be-positioned terminal is positioned by using the multipath information, the to-be-positioned terminal can be positioned more accurately.

Optionally, before step 701, the method further includes: The positioning center sends a positioning information measurement request to the positioning device, where the positioning information measurement request is used to request the positioning device to obtain the positioning parameter set. Correspondingly, the positioning device receives the positioning information measurement request from the positioning center. After the positioning device receives the positioning information measurement request, the positioning device may measure a parameter in the positioning parameter set based on the positioning information measurement request, in other words, perform step 701.

When the to-be-positioned terminal sends a plurality of reference signals, optionally, before step 701, the foregoing method further includes the following steps:

(11) The positioning center sends indication information to an access network device, where the indication information is used to indicate the to-be-positioned terminal to send N reference signals, where N is an integer greater than 1. Correspondingly, the access network device receives the indication information from the positioning center. The access network device is an access network device accessed by the to-be-positioned terminal.

(12) The access network device sends configuration information to the to-be-positioned terminal according to the indication information, where the configuration information is used to configure, for the to-be-positioned terminal, a resource for sending the N reference signals. Correspondingly, the to-be-positioned terminal receives the configuration information from the access network device.

(13) The to-be-positioned terminal sends the N reference signals based on the configuration information.

In this case, in specific implementation, step 701 may include: The positioning device measures the N reference signals sent by the to-be-positioned terminal, to obtain the multipath information in the positioning parameter set.

Optionally, time domain resources in the resource that is configured for the to-be-positioned terminal in the configuration information for sending the N reference signals are the same. In this case, in specific implementation, step (13) may include: The to-be-positioned terminal simultaneously sends the N reference signals based on the configuration information. Alternatively, time domain resources in the resource that is configured for the to-be-positioned terminal in the configuration information for sending the N reference signals are different. In this case, in specific implementation, step (13) may include: The to-be-positioned terminal sends the N reference signals on the different time domain resources (in other words, at different time points) based on the configuration information.

When the time domain resources in the resource that is configured for the to-be-positioned terminal in the configuration information for sending the N reference signals are the same, the to-be-positioned terminal may report capability information to the positioning center, and the capability information of the to-be-positioned terminal may include information about a quantity of reference signals that are supported by the to-be-positioned terminal for simultaneous sending.

To make this embodiment of this application clearer, the following describes in detail a process in which the positioning device calculates the equivalent LOS path information of the to-be-positioned terminal based on the multipath information of the to-be-positioned terminal. Specifically, the positioning device may calculate the equivalent LOS path information of the to-be-positioned terminal in either of the following manner 1 and manner 2.

Manner 1:

In specific implementation, the manner 1 may include the following steps:

(21) The positioning device obtains the multipath information (denoted as first multipath information) of the to-be-positioned terminal.

(22) The positioning device matches the first multipath information with multipath information (denoted as second multipath information) in a multipath information matching set based on a preset rule, and determines, as the location information of the to-be-positioned terminal, location information corresponding to the second multipath information that is in the multipath information matching set and that successfully matches the first multipath information.

The multipath information matching set includes a plurality of pieces of second multipath information, and each piece of second multipath information corresponds to one piece of location information. One piece of second multipath information is calculated based on a reference signal sent by one terminal. Location information corresponding to the second multipath information is location information of the terminal. In the manner 1, the location information corresponding to the second multipath information may be location information obtained by the terminal corresponding to the second multipath information through positioning by using a global positioning system (GPS).

The preset rule may be designed based on an actual application scenario. This is not specifically limited in this embodiment of this application. For example, the preset rule may be as follows: If a difference between an AOA of each NLOS path in some or all NLOS paths in the first multipath information and an AOA of one NLOS path in one piece of second multipath information is less than or equal to a preset threshold, the first multipath information successfully matches the second multipath information. For example, when the preset threshold is 2 degrees, if AOAs of two NLOS paths in the first multipath information are respectively 45 degrees and 30 degrees, and AOAs of two NLOS paths in the second multipath information are respectively 44 degrees and 29 degrees, the first multipath information successfully matches the second multipath information.

Manner 2:

In specific implementation, the manner 2 may include the following steps.

(31) The positioning device obtains J target positioning angles, where the J target positioning angles are in a one-to-one correspondence with J positioning angle sets, one target positioning angle is calculated (for example, through averaging or weighted averaging) based on positioning angles in a positioning angle set corresponding to the target positioning angle, each positioning angle set includes M positioning angles, the M positioning angles are in a one-to-one correspondence with M terminals, each of the M terminals includes J positioning angles, J positioning angles of one terminal are evenly distributed in J positioning angle sets, one positioning angle of one terminal is a positioning angle obtained by measuring a signal that is sent by the terminal and that is transmitted on one path, the plurality of terminals include the to-be-positioned terminal, a difference between a maximum positioning angle and a minimum positioning angle in the positioning angle set is less than or equal to a preset threshold, J is an integer greater than or equal to 3, and M is an integer greater than or equal to 2.

The positioning angle may include one type of positioning angle. For example, the positioning angle includes any one of an AOA, an AAOA, or a ZAOA. Alternatively, the positioning angle may include a plurality of types of positioning angles. For example, the positioning angle includes any two of an AOA, an AAOA, or a ZAOA, or the positioning angle includes an AOA, an AAOA, and a ZAOA. When the positioning angle includes a plurality of types of positioning angles, the target positioning angle also includes a plurality of types of positioning angles. A type of positioning angle in the target positioning angle is calculated based on the type of positioning angle in the positioning angle set corresponding to the target positioning angle. For example, if the positioning angle includes an AAOA and a ZAOA, the target positioning angle also includes an AAOA and a ZAOA. The AAOA in the target positioning angle is calculated (for example, through averaging or weighted averaging) based on all AAOAs in the positioning angle set corresponding to the target positioning angle, and the ZAOA in the target positioning angle is calculated (for example, through averaging or weighted averaging) based on all ZAOAs in the positioning angle set corresponding to the target positioning angle.

When the positioning angle includes a plurality of types of positioning angles, each type of positioning angle corresponds to one preset threshold, and preset thresholds corresponding to different types of positioning angles may be the same or different.

The J target positioning angles represent locations of J common reflection clusters of the M terminals.

(32) The positioning device determines the equivalent LOS path information of the to-be-positioned terminal based on the J target positioning angles and all TOAs, where all the TOAs are TOAs corresponding to all positioning angles in the J positioning angle sets, and the positioning angles are in a one-to-one correspondence with the TOAs.

Optionally, in specific implementation, step (31) includes the following steps:

(41) The positioning device clusters $j^{th}$ positioning angles of some or all terminals in a multipath feature library, and determines, as a $j^{th}$ source positioning angle set, a set that includes a $j^{th}$ positioning angle of the to-be-positioned terminal and that is in a clustering result. A $j^{th}$ positioning angle of a terminal is a positioning angle obtained by the positioning device by measuring a reference signal sent by the terminal and transmitted on the $j^{th}$ path.

(42) Determine whether j is equal to J, where J is a quantity of positioning angles of the to-be-positioned terminal, and j is an integer greater than 0 and less than or equal to J.

(43) If yes, determine the J positioning angle sets based on J source positioning angle sets, where one positioning angle set includes M positioning angles in a source positioning angle set corresponding to the positioning angle set, the M positioning angles are positioning angles of M terminals, and the M terminals are common terminals in terminals corresponding to positioning angles in the J source positioning angle sets. If no, j=j+1, and return to step (41).

(44) Determine the J target positioning angles based on the J positioning angle sets.

When clustering is performed in step (41), a threshold type algorithm may be used, or a clustering algorithm may be used. The clustering algorithm may be an expectation maximization algorithm (EM-Algorithm), a K-means clustering algorithm, or the like.

The multipath feature library may be stored in a memory of the positioning device, or may be stored in a memory outside the positioning device. The multipath feature library includes multipath information of a plurality of terminals with known locations and/or a plurality of terminals with unknown locations, and further includes the multipath information of the to-be-positioned terminal. A TOA corresponding to a $j^{th}$ positioning angle of a terminal in the multipath feature library is a $j^{th}$ largest TOA in TOAs corresponding to all positioning angles of the terminal. In other words, if a plurality of TOAs of the terminal are arranged in ascending order in the multipath feature library, the $j^{th}$ positioning angle of the terminal is a positioning angle corresponding to a $j^{th}$ TOA of the terminal.

For example, Table 2 shows information corresponding to three terminals in the multipath feature library. It should be noted that the multipath feature library usually includes information corresponding to many terminals. These terminals may be terminals that are historically positioned by the positioning device, may be terminals that need to be positioned, or may be terminals that are historically positioned but not successfully positioned. In Table 2, L(a, b) is a $b^{th}$ path through which a reference signal sent by an at h terminal passes, AOA(a, b) is an AOA that is of the $b^{th}$ path and that is obtained by measuring the $b^{th}$ path through which the reference signal sent by the at h terminal passes, meanings of AAOA(a, b) and ZAOA(a, b) are similar to this, TOA(a, b) is a TOA that is of the b$^{th}$ path and that is obtained by measuring the b$^{th}$ path through which the reference signal sent by the at h terminal passes, and a value of TOA(a, b+1) is less than that of TOA(a, b), where a is an integer greater than 0 and less than 4, and b is an integer greater than 0 and less than 7. It should be noted that a quantity of paths corresponding to each terminal in the multipath feature library may be the same or different. In this embodiment of this application, the quantity of paths corresponding to each terminal is not specifically limited. For example, a quantity of paths corresponding to a terminal 1 may be alternatively 10. A path corresponding to a terminal may include an LOS path or may not include an LOS path.

TABLE 2

| Terminal | Path | Positioning angle (one or more of the following) | TOA |
|---|---|---|---|
| 1 | L(1, 1) | AOA(1, 1), AAOA(1, 1), ZAOA(1, 1) | TOA(1, 1) |
|   | L(1, 2) | AOA(1, 2), AAOA(1, 2), ZAOA(1, 2) | TOA(1, 2) |
|   | L(1, 3) | AOA(1, 3), AAOA(1, 3), ZAOA(1, 3) | TOA(1, 3) |
|   | L(1, 4) | AOA(1, 4), AAOA(1, 4), ZAOA(1, 4) | TOA(1, 4) |
|   | L(1, 5) | AOA(1, 5), AAOA(1, 5), ZAOA(1, 5) | TOA(1, 5) |
|   | L(1, 6) | AOA(1, 6), AAOA(2, 6), ZAOA(2, 6) | TOA(1, 6) |
| 2 | L(2, 1) | AOA(2, 1), AAOA(2, 1), ZAOA(2, 1) | TOA(2, 1) |
|   | L(2, 2) | AOA(2, 2), AAOA(2, 2), ZAOA(2, 2) | TOA(2, 2) |
|   | L(2, 3) | AOA(2, 3), AAOA(2, 3), ZAOA(2, 3) | TOA(2, 3) |
|   | L(2, 4) | AOA(2, 4), AAOA(2, 4), ZAOA(2, 4) | TOA(2, 4) |
|   | L(2, 5) | AOA(2, 5), AAOA(2, 5), ZAOA(2, 5) | TOA(2, 5) |
| 3 | L(3, 1) | AOA(3, 1), AAOA(3, 1), ZAOA(3, 1) | TOA(3, 1) |
|   | L(3, 2) | AOA(3, 2), AAOA(3, 2), ZAOA(3, 2) | TOA(3, 2) |
|   | L(3, 3) | AOA(3, 3), AAOA(3, 3), ZAOA(3, 3) | TOA(3, 3) |
|   | L(3, 4) | AOA(3, 4), AAOA(3, 4), ZAOA(3, 4) | TOA(3, 4) |

In specific implementation of step (44), the positioning device may obtain a target positioning angle corresponding to a positioning angle set by averaging or performing weighted averaging on positioning angles in the positioning angle set. An AAOA in a target positioning angle corresponding to a $j^{th}$ positioning angle set may be denoted as $\hat{\theta}_v[j]$, and a ZAOA in the target positioning angle corresponding to the PI positioning angle set may be denoted as $\hat{\phi}_v[j]$.

Figure 8:
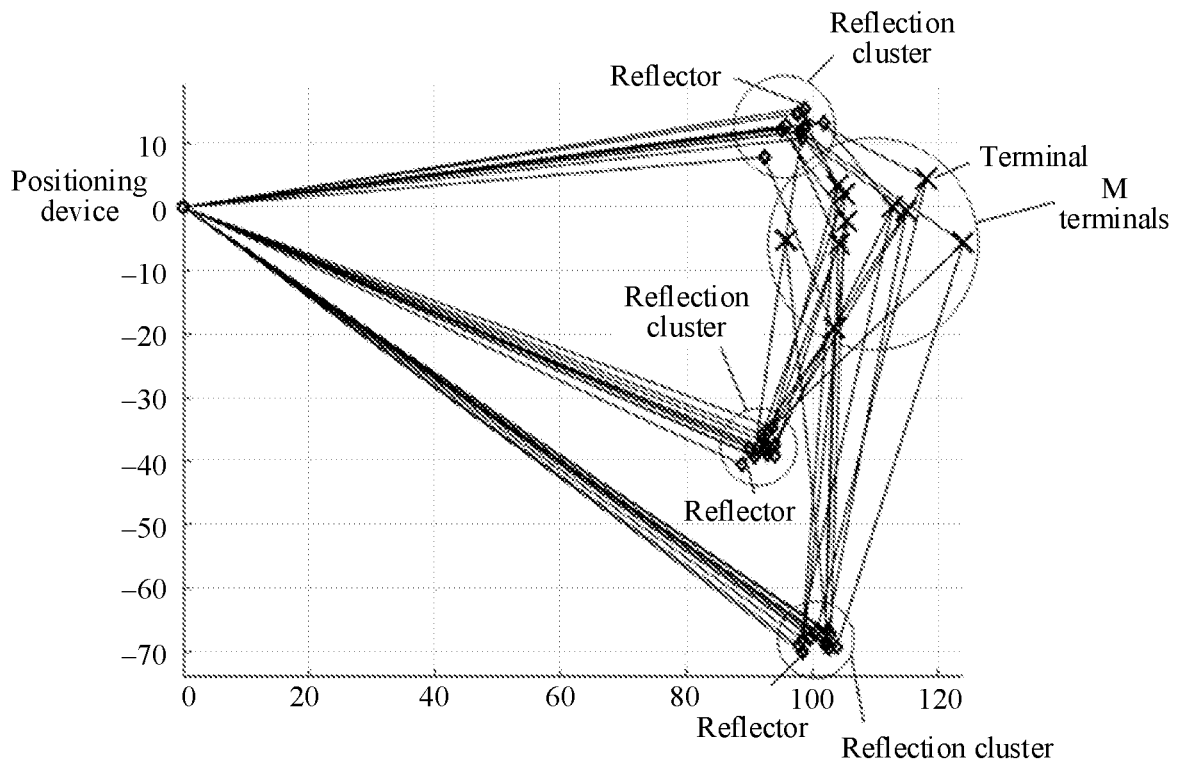
FIG. 8 is a schematic diagram of an angle relationship between M terminals, a positioning device, and a reflection cluster according to an embodiment of this application.

For clearer understanding of step (41) to step (44), a process of step (41) to step (44) is described below by using an example. It is assumed that the multipath feature library includes multipath information of 100 terminals, and each terminal corresponds to AAOAs and TOAs of three paths, where a TOA of a first path of each terminal is less than a TOA of a second path, and the TOA of the second path is less than a TOA of a third path. AAOAs of first paths of the 100 terminals are clustered to obtain five sets. If the to-be-positioned terminal is a first terminal in the 100 terminals, a set including an AAOA of a first path of the first terminal is reserved to obtain a first source positioning angle set. AAOAs of second paths and AAOAs of third paths of the 100 terminals are clustered by using a same method, and a second source positioning angle set and a third source positioning angle set are respectively obtained. If the first source positioning angle set includes AAOAs of first 20 terminals in the 100 terminals, the second source positioning angle set includes AAOAs of first 15 terminals in the 100 terminals, and the third source positioning angle set includes AAOAs of first 18 terminals in the 100 terminals, a first positioning angle set includes AAOAs of first paths of the first 15 terminals in the 100 terminals, a second positioning angle set includes AAOAs of second paths of the first 15 terminals in the 100 terminals, and a third positioning angle set includes AAOAs of third paths of the first 15 terminals in the 100 terminals. AAOAs in the first positioning angle set are averaged to obtain a first target AAOA, AAOAs in the second positioning angle set are averaged to obtain a second target AAOA, and AAOAs in the third positioning angle set are averaged to obtain a third target AAOA. As shown in FIG. 8, three target AAOAs represent locations of three common reflection clusters of M terminals (M is 15 in this example). A similar method is used to calculate a target ZAOA, and details are not described again.

Optionally, in specific implementation, step (32) includes:
(51). The positioning device determines LOS path information of the to-be-positioned terminal based on the J target positioning angles, all TOAs, and a cost equation, where the J target positioning angles and all the TOAs are input parameters of the cost equation.

In specific implementation of step (51), the positioning device may select a 2D positioning algorithm or a 3D positioning algorithm based on a requirement to position the to-be-positioned terminal (it is assumed that the to-be-positioned terminal is a terminal i in the M terminals, where i is an integer greater than 0 and less than or equal to M). A 2D positioning process and a 3D positioning process are respectively described below.

Figure 9:
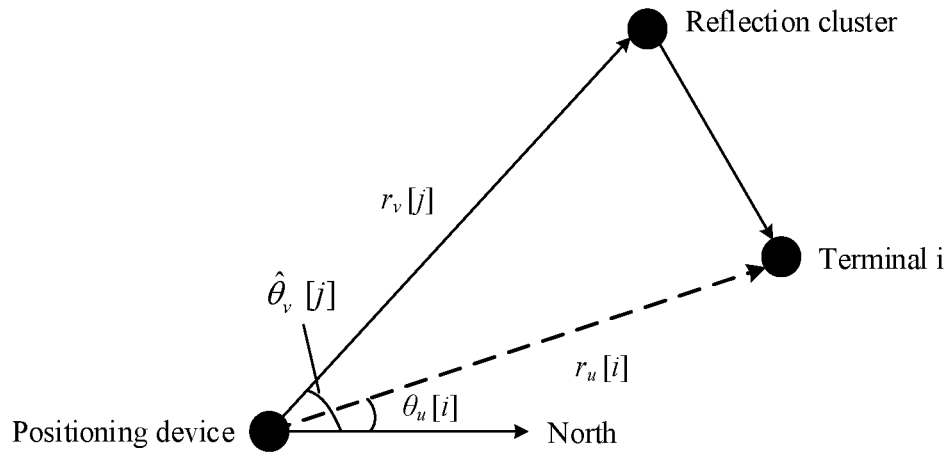
FIG. 9 is a schematic diagram of an angle relationship between a terminal i, a positioning device, and a $j^{th}$ reflection cluster according to an embodiment of this application.

2D Positioning Process:

As shown in FIG. 9, based on a triangle principle of vector addition, $\hat{r}_{uv}[0]-r_v[j]=\|\vec{v}[j]-\vec{u}[i]\|_2$, where $\hat{r}_{uv}[i,j]$ is a total length of a path from the terminal i to the positioning device through a reflection cluster j, and $\hat{r}_{uv}[i,j]$ may be calculated by using a TOA; $r_v[j]$ is a total length of a path from the reflection cluster j to the positioning device, $\|\vec{v}[j]-\vec{u}[i]\|_2$ means a Euclidean distance of $\vec{v}[j]-\vec{u}[i]$, $\vec{v}[j]$ is a vector from the positioning device to the reflection cluster j, $\vec{u}[i]$ is a vector from the positioning device to the terminal i, and $\vec{v}[j]-\vec{u}[i]$ is a vector from the reflection cluster j to the terminal i, and $$\|\vec{v}[j]-\vec{u}[i]\|_2 = \sqrt{\left(r_u[i]\cos\theta_u[i]-r_v[j]\cos\hat{\theta}_v[j]\right)^2 + \left(r_u[i]\sin\theta_u[i]-r_v[j]\sin\hat{\theta}_v[j]\right)^2},$$

where $\hat{\theta}_v[j]$ is an AAOA in a target positioning angle corresponding to the $j^{th}$ positioning angle set, $r_u[i]$ is a total length of a path from the terminal i to the positioning device, and $\theta_u[i]$ is an AAOA of an equivalent LOS path of the terminal i.

In this case, the positioning device may obtain, through calculation, the AAOA (that is, $\theta_u[i]$) of the equivalent LOS path of the terminal i and the total length (that is, $r_u[i]$) of the path from the terminal i to the positioning device by using the following cost equation (1):

$$\arg\min_{\theta_u,r_u,r_v} \sum_{\forall i,\forall j}^{N_u,N_v} (\hat{r}_{uv}[i,j]-r_v[j]-\|\vec{v}[j]-\vec{u}[i]\|_2)^2 \quad (1)$$

$N_u$ and $N_v$ respectively represent a quantity (that is, M) of terminals and a quantity (that is, J) of reflection clusters.

When the cost equation 1 meets a formula 2, there is a unique solution.

$$\begin{cases} N_u N_v \geq 2N_u + N_v \\ \hat{\theta}_u[i] \neq \hat{\theta}_v[j], \forall ij \end{cases} \quad (2)$$

3D Positioning Process:

The positioning device may obtain, through calculation, an AAOA (denoted as $\theta_u[i]$) of the equivalent LOS path of the terminal i, a ZAOA (denoted as [i]) of the equivalent LOS path, and a distance (denoted as rad) between the terminal i and the positioning device by using the following cost equation (3):

$$\arg\min_{\theta_u,\phi_u,r_u,r_v} \sum_{\forall i,\forall j}^{N_u,N_v} (\hat{r}_{uv}[i,j] - r_v[j] - B)^2 \qquad (3)$$

$$B = \sqrt{\left(r_u[i]\cos\theta_u[i]\cos\theta_u[i] - r_v[j]\cos\hat{\theta}[j]\cos\hat{\phi}_v[j]\right)^2 + \left(r_u[i]\sin\theta_u[i]\cos\phi_u[i] - r_v[j]\sin\hat{\theta}_v[j]\cos\hat{\phi}_v[j]\right)^2 + \left(r_u[i]\sin\phi_u[i] - r_v[j]\sin\hat{\phi}_v[j]\right)^2},$$

where $\hat{\theta}_v[j]$ is an AAOA in a target positioning angle corresponding to a $j^{th}$ positioning angle set, and $\hat{\phi}_v[j]$ is a ZAOA in the target positioning angle corresponding to the $j^{th}$ positioning angle set. For meanings of other parameters in the equation (3), refer to the foregoing descriptions.

When the cost equation 3 meets a formula 4, there is a unique solution.

$$\begin{cases} N_u N_v \geq 2N_u + N_v \\ \hat{\theta}_u[i] \neq \hat{\theta}_v[j], \hat{\phi}_v[i] \neq \hat{\phi}_v[j], \forall ij \end{cases} \qquad (4)$$

A principle of the 3D positioning process is similar to that of the 2D positioning process, and is deduced by using the triangle principle of vector addition. Details are not described herein again. Based on the 2D positioning process and the 3D positioning process, locations of all terminals with unknown locations in the M terminals may be calculated. Naturally, the location information of the to-be-positioned terminal can be obtained.

After the equivalent LOS path information of the to-be-positioned terminal is calculated, the positioning device may obtain the longitude and latitude information of the to-be-positioned terminal through calculation based on the equivalent LOS path information of the to-be-positioned terminal and longitude and latitude information of the positioning device. A process in which the positioning device obtains the equivalent LOS path information of the to-be-positioned terminal through calculation based on the multipath information and information in the multipath feature library may be referred to as matching calculation. It should be noted that the multipath feature library may further include one or more pieces of the latitude and longitude information or the equivalent LOS path information of the terminal. After obtaining the equivalent LOS path information of the to-be-positioned terminal through calculation, the positioning device may save the information such as the multipath information, the equivalent LOS path information, and the longitude and latitude information of the to-be-positioned terminal to the multipath feature library.

It should be noted that, when the positioning device cannot determine the equivalent LOS path information of the to-be-positioned terminal, for example, a stable cluster cannot be obtained in the foregoing clustering process, or when the quantity (in other words, a value of M) of terminals is insufficient (for example, is less than 5), the positioning device does not report the longitude information of the to-be-positioned terminal, the latitude information of the to-be-positioned terminal, or the equivalent LOS path information of the to-be-positioned terminal to the positioning center, and reports only the multipath information. In this case, if the positioning parameter set includes a field used to carry the equivalent LOS path information and/or the longitude and latitude information of the to-be-positioned terminal, the field may carry an invalid parameter, for example, −999.

The positioning center may also calculate the equivalent LOS path information of the to-be-positioned terminal based on the multipath information of the to-be-positioned terminal in the foregoing manner 1 or manner 2. A difference lies only in that an execution body herein is the positioning center. In this case, the multipath feature library may be stored in the positioning center.

To make this embodiment of this application clearer, a positioning procedure involved in this embodiment of this application is described below by using Embodiment 1 and Embodiment 2 as examples.

Embodiment 1

Figure 10:
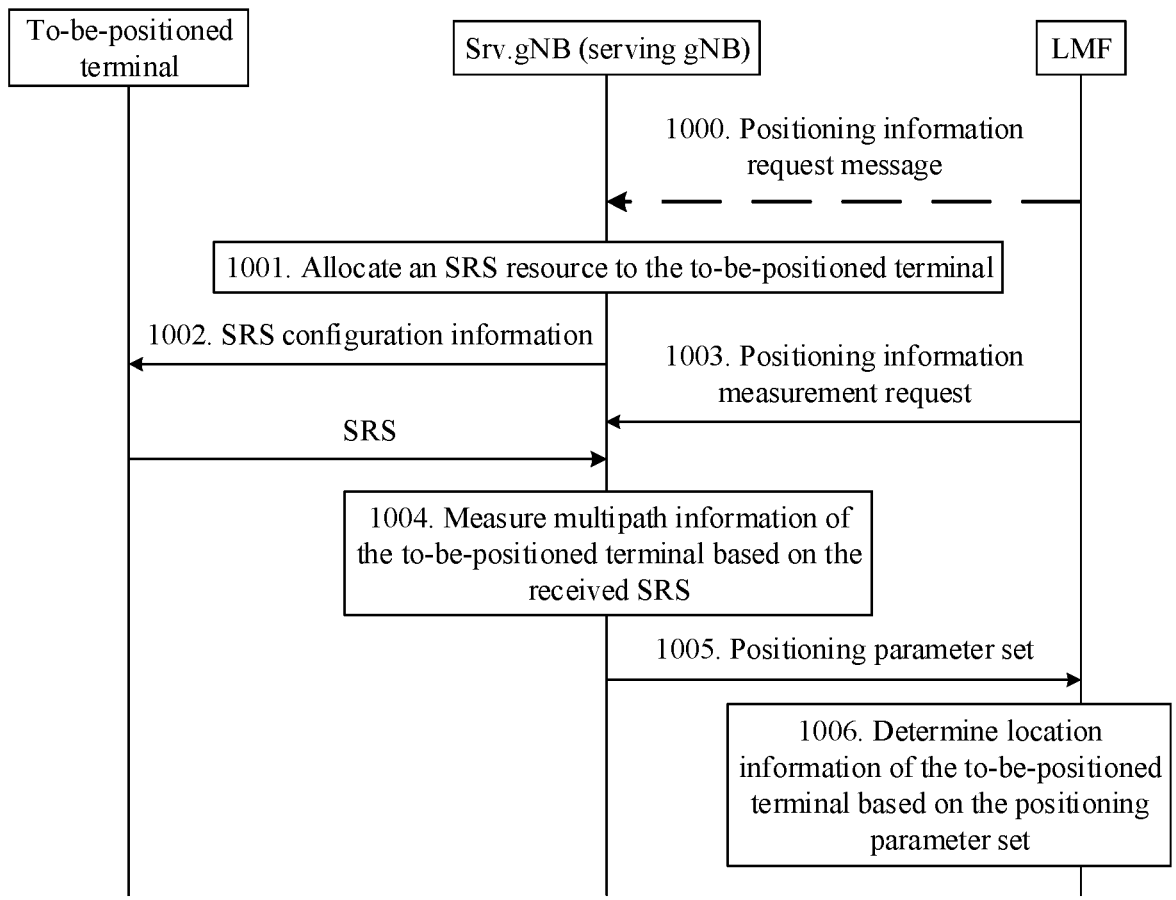
FIG. 10 and FIG. 11 are respectively interaction flowcharts of a positioning method according to an embodiment of this application.

Embodiment 1 may be applied to the network architecture shown in FIG. 3. As shown in FIG. 10, the method includes the following steps.

1001. A Srv.gNB allocates an SRS resource to a to-be-positioned terminal.

Before step 1001, the Srv.gNB may independently determine to perform step 1001 after positioning the to-be-positioned terminal, or may perform step 1001 after being triggered by an LMF. If the Srv.gNB determines to perform step 1001 after being triggered by the LMF, before step 1001, the method may further include: 1000. The LMF sends a positioning information request message to the Srv.gNB. In this case, in specific implementation, step 1001 may include: The Srv.gNB allocates the SRS resource to the to-be-positioned terminal based on a positioning information request.

1002. The Srv.gNB sends SRS configuration information to the to-be-positioned terminal, where the SRS configuration information includes the SRS resource allocated by the Srv.gNB to the to-be-positioned terminal.

The SRS resource may be a resource used by the to-be-positioned terminal to simultaneously send a plurality of SRSs, or may be a resource used by the to-be-positioned terminal to send different SRSs at different time points, or may be a resource used by the to-be-positioned terminal to send a same SRS at different time points. This is not specifically limited in this embodiment of this application.

After step 1002, the to-be-positioned terminal sends an SRS based on the received SRS configuration information.

1003. The LMF sends a positioning information measurement request to the Srv.gNB.

Before step 1003, the LMF may independently determine whether to send the positioning information measurement request to the Srv.gNB or an Nbr.gNB, or send the positioning information measurement request to the Srv.gNB and an Nbr.gNB. All gNBs that receive the positioning information measurement request perform the subsequent step 1004 and step 1005. For ease of description in this embodiment of this application, that the LMF sends the positioning information measurement request to the Srv.gNB is used as an example for description in step 1003 to step 1005.

It should be noted that if the LMF sends the positioning information measurement request to the Nbr.gNB, the LMF may further indicate the Srv.gNB to send the SRS resource allocated to the to-be-positioned terminal to the Nbr.gNB, so that the Nbr.gNB receives, on a corresponding resource, the SRS sent by the to-be-positioned terminal.

The positioning information measurement request may include one or more of the following information: TOA measurement configuration (for example, a TOA resolution), and AOA, AAOA, and ZAOA measurement configuration (for example, angle ranges of measurement of the Srv.gNB that respectively correspond to an AOA, an AAOA, and a ZAOA).

The positioning information measurement request may also be referred to as a single-station AOA+TOA measurement request.

It should be understood that step 1003 may also be performed together with step 1000, or is performed immediately after step 1000. Herein, step 1003 is placed after step 1002 due to a description requirement, but it does not indicate a limitation on a sending relationship between steps.

1004. The Srv.gNB receives the SRS sent by the to-be-positioned terminal, and measures multipath information of the to-be-positioned terminal based on the received SRS.

Further, the Srv.gNB may further calculate longitude and latitude information and equivalent LOS path information of the to-be-positioned terminal based on the multipath information.

1005. The Srv.gNB sends a positioning parameter set to the LMF, where the positioning parameter set includes the multipath information. Correspondingly, the LMF receives the positioning parameter set from the Srv.gNB.

Optionally, the positioning parameter set further includes one or more of the longitude and latitude information and the equivalent LOS path information of the to-be-positioned terminal.

1006. The LMF determines location information of the to-be-positioned terminal based on the positioning parameter set.

In specific implementation of step 1006, when the positioning parameter set includes only the multipath information, the LMF may determine the location information of the to-be-positioned terminal based on the multipath information in the foregoing manner 1 or manner 2. When the positioning parameter set further includes one or more of the longitude and latitude information and the equivalent LOS path information of the to-be-positioned terminal, any one piece of information in the longitude and latitude information and the equivalent LOS path information of the to-be-positioned terminal may represent the location information of the to-be-positioned terminal, and the LMF directly obtains the location information of the to-be-positioned terminal based on the positioning parameter set. Certainly, the LMF may also obtain more accurate location information of the to-be-positioned terminal by averaging (or performing weighted averaging on) latitude and longitude information (or equivalent LOS path information) of the to-be-positioned terminal that is measured by a plurality of gNBs.

Embodiment 2

Figure 11:
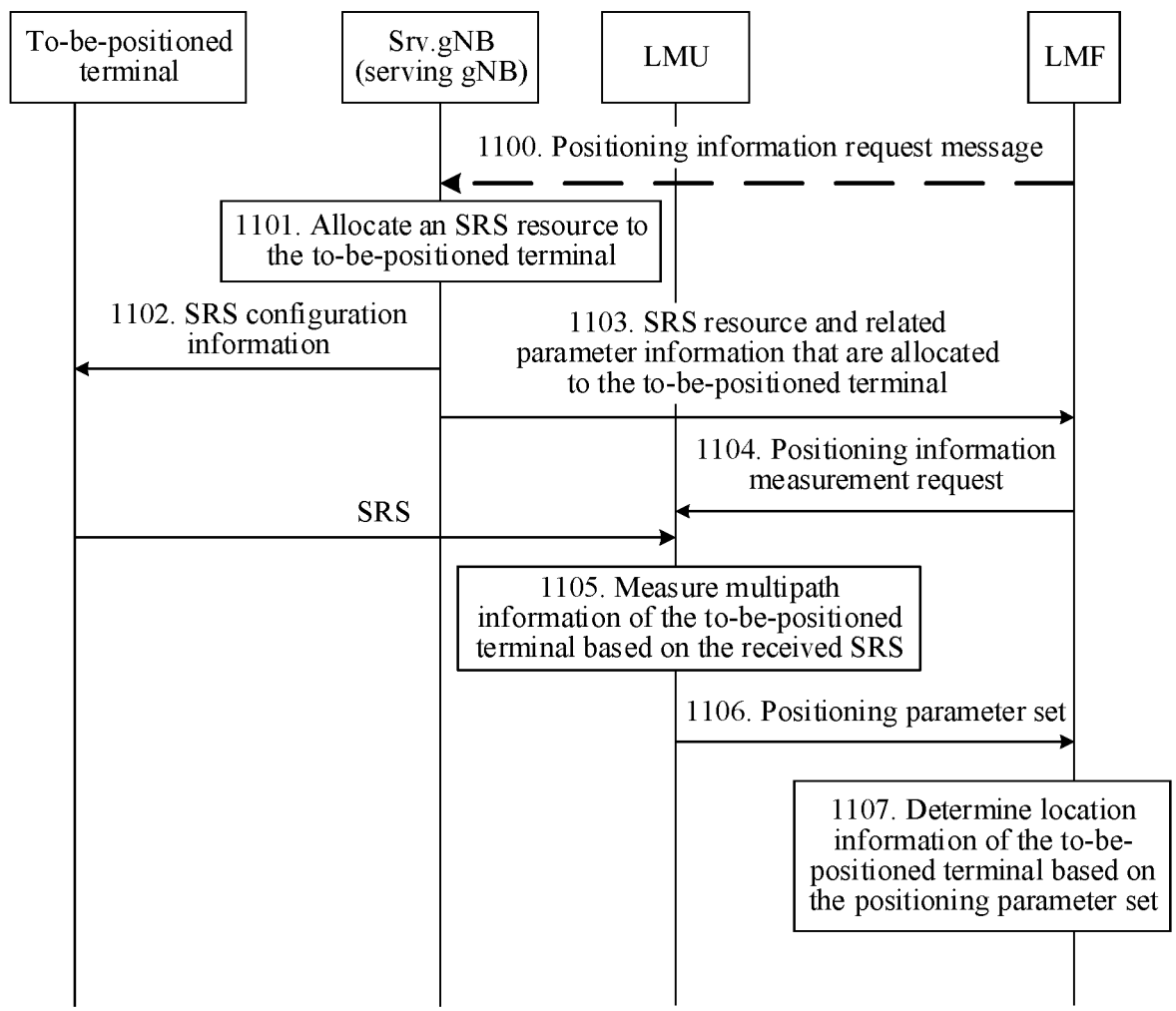

Embodiment 2 may be applied to the network architecture shown in FIG. 4. As shown in FIG. 11, the method includes the following steps.

1101. A Srv.gNB allocates an SRS resource to a to-be-positioned terminal.

Before step 1101, the Srv.gNB may independently determine to perform step 1101 after positioning the to-be-positioned terminal, or may perform step 1101 after being triggered by an LMF. If the Srv.gNB determines to perform step 1101 after being triggered by the LMF, before step 1101, the method may further include: 1100. The LMF sends a positioning information request message to the Srv.gNB. In this case, in specific implementation, step 1101 may include: The Srv.gNB allocates the SRS resource to the to-be-positioned terminal based on a positioning information request.

1102. The Srv.gNB sends SRS configuration information to the to-be-positioned terminal, where the SRS configuration information includes the SRS resource allocated by the Srv.gNB to the to-be-positioned terminal.

The SRS resource may be a resource used by the to-be-positioned terminal to simultaneously send a plurality of SRSs, or may be a resource used by the to-be-positioned terminal to send different SRSs at different time points, or may be a resource used by the to-be-positioned terminal to send a same SRS at different time points. This is not specifically limited in this embodiment of this application.

After step 1102, the to-be-positioned terminal sends an SRS based on the received SRS configuration information.

1103. The Srv.gNB reports, to the LMF, the SRS resource and related parameter information that are allocated to the to-be-positioned terminal.

After step 1103, the LMF may further send, to an LMU, the SRS resource and the related parameter information that are allocated to the to-be-positioned terminal, so that the LMU receives, on a corresponding resource, the SRS sent by the to-be-positioned terminal.

The related parameter information may include an uplink configuration parameter allocated to the to-be-positioned terminal, for example, information such as a quantity of SRS periods, SRS bandwidth, a center frequency, a quantity of antenna ports, and frequency hopping bandwidth.

1104. The LMF sends a positioning information measurement request to the LMU.

Before step 1104, the LMF may independently determine whether to send the positioning information measurement request to one LMU or a plurality of LMUs. All LMUs that receive the positioning information measurement request perform the subsequent step 1105 and step 1106. For ease of description in this embodiment of this application, that the LMF sends the positioning information measurement request to one LMU is used as an example for description in step 1104 to step 1106.

The positioning information measurement request may be an SLmAP message.

The positioning information measurement request may include one or more of the following information: TOA measurement configuration (for example, a TOA resolution), and AOA, AAOA, and ZAOA measurement configuration (for example, angle ranges of measurement of the LMU that respectively correspond to an AOA, an AAOA, and a ZAOA).

The positioning information measurement request may also be referred to as a single-station AOA+TOA measurement request.

1105. The LMU receives the SRS sent by the to-be-positioned terminal, and measures multipath information of the to-be-positioned terminal based on the received SRS.

Further, the LMU may further calculate longitude and latitude information and equivalent LOS path information of the to-be-positioned terminal based on the multipath information.

1106. The LMU sends a positioning parameter set to the LMF, where the positioning parameter set includes the multipath information. Correspondingly, the LMF receives the positioning parameter set from the LMU.

Optionally, the positioning parameter set further includes one or more of the longitude and latitude information and the equivalent LOS path information of the to-be-positioned terminal.

1107. The LMF determines location information of the to-be-positioned terminal based on the positioning parameter set.

In specific implementation of step 1107, when the positioning parameter set includes only the multipath information, the LMF may determine the location information of the to-be-positioned terminal based on the multipath information in the foregoing manner 1 or manner 2. When the positioning parameter set further includes one or more of the longitude and latitude information and the equivalent LOS path information of the to-be-positioned terminal, any one piece of information in the longitude and latitude information and the equivalent LOS path information of the to-be-positioned terminal may represent the location information of the to-be-positioned terminal, and the LMF directly obtains the location information of the to-be-positioned terminal based on the positioning parameter set. Certainly, the LMF may also obtain more accurate location information of the to-be-positioned terminal by averaging (or performing weighted averaging on) latitude and longitude information (or equivalent LOS path information) of the to-be-positioned terminal that is measured by a plurality of LMUs.

The foregoing mainly describes solutions in embodiments of this application from a perspective of interaction between network elements. It may be understood that to implement the foregoing functions, each network element, such as the positioning device or the positioning center, includes a corresponding hardware structure and/or software module that is used to perform each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, division into functional units may be performed on the positioning device or the positioning center based on the foregoing example of the method. For example, functional units may be divided based on corresponding functions, or two or more than two functions may be integrated into one processing unit. The integrated unit may be implemented in a form of hardware, or may be implemented in a form of a software functional unit. It should be noted that, in the embodiments of this application, division into the units is an example, and is merely a logical function division. In actual implementation, another division manner may be used.

Figure 12:
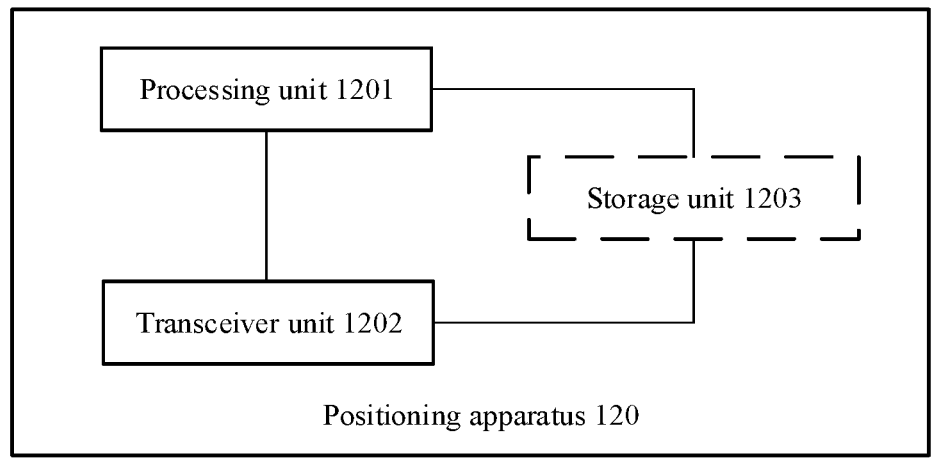
FIG. 12 is a schematic diagram of composition of a positioning apparatus according to an embodiment of this application.

When an integrated unit is used, FIG. 12 is a possible schematic structural diagram of a positioning apparatus (denoted as a positioning apparatus 120). The positioning apparatus 120 includes a processing unit 1201 and a transceiver unit 1202. Optionally, the apparatus further includes a storage unit 1203. The storage unit 1203 is configured to store computer programs, and the processing unit 1201 is configured to invoke the computer programs from the storage unit 1203 and run the computer programs, to perform a corresponding action below. The positioning apparatus 120 may be the positioning device or the positioning center in the foregoing embodiments.

When the positioning apparatus 120 is the positioning device:

The processing unit 1201 is configured to obtain a positioning parameter set, where the positioning parameter set includes multipath information of a to-be-positioned terminal, and the multipath information is used to position the to-be-positioned terminal.

The transceiver unit 1202 is configured to send the positioning parameter set to a positioning center.

Optionally, the multipath information includes a measurement value corresponding to each path in a plurality of different paths, the plurality of different paths are a plurality of different transmission paths along which a reference signal sent by the to-be-positioned terminal arrives at the positioning apparatus, the measurement value corresponding to each path includes a measurement value obtained by the positioning apparatus by measuring a reference signal transmitted on the path, and the measurement value includes one or more of a measurement value of an azimuth angle of arrival, a measurement value of a zenith angle of arrival, a measurement value of time of arrival, or a measurement value of an angle of arrival.

Optionally, the plurality of different paths are a plurality of different transmission paths along which one reference signal sent by the to-be-positioned terminal arrives at the positioning apparatus; or the plurality of different paths are a plurality of different transmission paths along which one reference signal sent by the to-be-positioned terminal at different times arrives at the positioning apparatus; or the plurality of different paths are different transmission paths along which a plurality of reference signals sent by the to-be-positioned terminal arrive at the positioning apparatus.

Optionally, the positioning parameter set further includes one or more of longitude information of the to-be-positioned terminal, latitude information of the to-be-positioned terminal, or equivalent LOS path information of the to-be-positioned terminal. The equivalent LOS path information of the to-be-positioned terminal includes one or more of an azimuth angle of arrival of an equivalent LOS path, a zenith angle of arrival of an equivalent LOS path, time of arrival of an equivalent LOS path, or an angle of arrival of an equivalent LOS path that is calculated based on the multipath information.

Optionally, the transceiver unit 1202 is further configured to receive a positioning information measurement request from the positioning center, where the positioning information measurement request is used to request the positioning apparatus to obtain the positioning parameter set.

Optionally, the positioning parameter set is carried in an NRPPa message or an SLmAP message.

When the positioning apparatus 120 is the positioning device in the foregoing embodiments, the positioning apparatus 120 is configured to perform an action performed by the positioning device in the foregoing methods. Therefore, for beneficial effects of the positioning apparatus 120, refer to the beneficial effects of the foregoing method. Details are not described herein again.

When the positioning apparatus 120 is the positioning center:

The processing unit 1201 is configured to receive a positioning parameter set from a positioning device by using the transceiver unit 1202, where the positioning parameter set includes multipath information of a to-be-positioned terminal, and the multipath information is used to position the to-be-positioned terminal.

The processing unit 1201 is further configured to return a response to the positioning device by using the transceiver unit 1202, where the response is used to indicate that the positioning apparatus receives the positioning parameter set.

Optionally, the multipath information includes a measurement value corresponding to each path in a plurality of different paths, the plurality of different paths are a plurality of different transmission paths along which a reference signal sent by the to-be-positioned terminal arrives at the positioning device, the measurement value corresponding to each path includes a measurement value obtained by the positioning device by measuring a reference signal transmitted on the path, and the measurement value includes one or more of a measurement value of an azimuth angle of arrival, a measurement value of a zenith angle of arrival, a measurement value of time of arrival, or a measurement value of an angle of arrival.

Optionally, the plurality of different paths are a plurality of different transmission paths along which one reference signal sent by the to-be-positioned terminal arrives at the positioning device; or the plurality of different paths are a plurality of different transmission paths along which one reference signal sent by the to-be-positioned terminal at different times arrives at the positioning device; or the plurality of different paths are different transmission paths along which a plurality of reference signals sent by the to-be-positioned terminal arrive at the positioning device.

Optionally, the positioning parameter set further includes one or more of longitude information of the to-be-positioned terminal, latitude information of the to-be-positioned terminal, or equivalent LOS path information of the to-be-positioned terminal. The equivalent LOS path information of the to-be-positioned terminal includes one or more of an azimuth angle of arrival of an equivalent LOS path, a zenith angle of arrival of an equivalent LOS path, time of arrival of an equivalent LOS path, or an angle of arrival of an equivalent LOS path that is calculated based on the multipath information.

Optionally, the processing unit 1201 is further configured to send a positioning information measurement request to the positioning device by using the transceiver unit 1202, where the positioning information measurement request is used to request the positioning device to obtain the positioning parameter set.

Optionally, the positioning parameter set is carried in an NRPPa message or an SLmAP message.

When the positioning apparatus 120 is the positioning center, the positioning apparatus 120 is configured to perform an action performed by the positioning center in the foregoing methods. Therefore, for beneficial effects of the positioning apparatus 120, refer to the beneficial effects of the foregoing method. Details are not described herein again.

Figure 13:
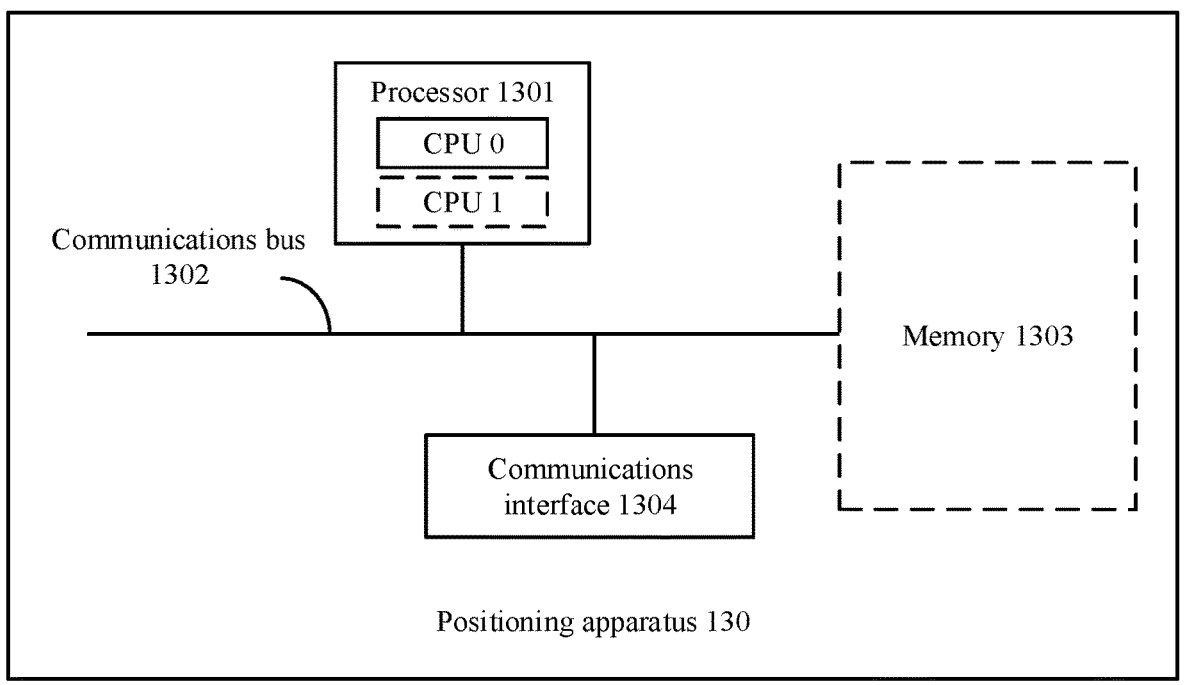
FIG. 13 is a schematic diagram of a hardware structure of a positioning apparatus according to an embodiment of this application.

An embodiment of this application further provides a positioning apparatus, as shown in FIG. 13. FIG. 13 is a schematic structural diagram of hardware of a positioning apparatus (denoted as a positioning apparatus 130) according to an embodiment of this application. The positioning apparatus 130 may be the positioning device or the positioning center in this specification. The positioning apparatus 130 includes at least one processor 1301, a communications bus 1302, and at least one communications interface 1304. Optionally, the apparatus further includes a memory 1303. FIG. 13 is drawn by using an example in which the positioning apparatus 130 includes one processor 1301 and one communications interface 1304.

The processor 1301, the communications interface 1304, and the memory 1303 may be connected by using the communications bus 1302 to implement mutual communication and transfer a control signal and/or a data signal. The memory 1303 is configured to store computer programs. The processor 1301 is configured to invoke the computer programs from the memory 1303 and run the computer programs, to control the communications interface 1304 to receive and send a signal.

In a first possible implementation, the processor 1301 may be a general-purpose central processing unit (CPU), a microprocessor, an application-specific integrated circuit (ASIC), or one or more integrated circuits configured to control program execution in the solutions of this application. The communications interface 1304 may be any apparatus such as a transceiver.

In a second possible implementation, the processor 1301 may be a logic circuit, and the communications interface 1304 may include an input interface and an output interface.

The communications interface 1304 is configured to communicate with another device or communications network by using any apparatus such as a transceiver.

The memory 1303 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited thereto. The memory may exist independently and is connected to the processor by using the communications bus 1302. The memory may alternatively be integrated with the processor.

The memory 1303 is configured to store computer execution instructions for performing the solutions in this application, and the computer execution instructions is executed under control of the processor 1301. The processor 1301 is configured to execute the computer execution instructions stored in the memory 1303, to implement the method provided in the following embodiments of this application.

Optionally, the computer execution instructions in this embodiment of this application may also be referred to as application program code. This is not specifically limited in this embodiment of this application.

When the schematic structural diagram shown in FIG. 13 shows a structure of the positioning device, the processor 1301 is configured to control and manage an action of the positioning device. For example, the processor 1301 is configured to support the positioning device in performing step 701 to step 703 in FIG. 7, step 1000 to step 1005 in FIG. 10 (in this case, the positioning device is the Srv.gNB in FIG. 10), step 1104 to step 1106 in FIG. 11 (in this case, the positioning device is the LMU in FIG. 11), and/or an action performed by the positioning device in another process described in embodiments of this application. The communications interface 1304 is configured to support the positioning device in communicating with another network entity, for example, communicating with the positioning center shown in FIG. 7. The memory 1303 is configured to store program code and data of the positioning device.

When the schematic structural diagram shown in FIG. 13 shows a structure of the positioning center, the processor 1301 is configured to control and manage an action of the positioning center. For example, the processor 1301 is configured to support the positioning center in performing step 702 and step 703 in FIG. 7, step 1000, step 1003, step 1005, and step 1006 in FIG. 10 (in this case, the positioning center is the LMF in FIG. 10), step 1100, step 1103, step 1104, step 1106, and step 1107 in FIG. 11 (in this case, the positioning center is the LMF in FIG. 11), and/or an action performed by the positioning center in another process described in embodiments of this application. The communications interface 1304 is configured to support the positioning center in communicating with another network entity, for example, communicating with the positioning device shown in FIG. 7. The memory 1303 is configured to store program code and data of the positioning center.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communications system. The communications system includes the positioning device and the positioning center in the foregoing embodiments. Optionally, the communications system further includes a terminal. Optionally, when the positioning device is not an access network device accessed by the terminal, the communications system further includes an access network device accessed by the terminal.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a non-transitory computer-readable storage medium or may be transmitted from a non-transitory computer-readable storage medium to another non-transitory computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The non-transitory computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to various disclosed embodiments, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims.

Although this application is described with reference to specific features and embodiments thereof, it will be appreciated that various modifications and combinations may be made to them without departing from the spirit and scope of this application. It will be appreciated that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method of positioning a terminal, the method comprising:
    acquiring, by a positioning device, a positioning parameter set comprising multipath information of the terminal,
        wherein an equivalent line of sight (LOS) path information of the terminal is determined by combining, into the positioning parameter set, multipath information of a plurality of reference terminals,
        wherein the combining includes a clustering process carried out on a multipath feature library,
        wherein the multipath feature library comprises stored multipath information of the plurality of reference terminals and the multipath information of the terminal to be positioned,
        wherein the multipath information includes a measurement value associated with each of a plurality of different transmission paths,
        wherein each of the plurality of different transmission paths is a path through which a reference signal, sent by the terminal to be positioned or one of the reference terminals, reaches the positioning device,
        wherein the measurement value associated with each path of the plurality of different transmission paths includes a measurement value obtained by the positioning device measuring the reference signal transmitted through the respective transmission path,
        wherein the measurement value includes one or more of an arrival azimuth angle measurement value, an arrival zenith angle measurement value, an arrival time measurement value, or an arrival angle measurement value,
        wherein the positioning parameter set includes equivalent LOS path information of the terminal to be positioned,
        wherein the equivalent LOS path is a straight transmission path from the terminal to be positioned to the positioning device, and wherein the equivalent LOS path information of the terminal to be positioned includes one or more of an arrival azimuth angle of the equivalent LOS path, an arrival zenith angle of the equivalent LOS path, arrival time of the equivalent LOS path, or an arrival angle of the equivalent LOS path, which are determined according to the multipath information of the terminal to be positioned, the multipath information of the multiple reference terminals and a cost equation; and sending, by the positioning device, the positioning set to a positioning center.

2. The method of claim 1, further comprising:
receiving, by the positioning device, a positioning information measurement request from the positioning center, wherein the positioning information measurement request is for requesting the positioning device to acquire the positioning parameter set.

3. The method of claim 1, wherein the set of positioning parameters is carried in a new air interface positioning protocol copy (NRPPa) message or an evolved serving mobile positioning center location measurement unit application protocol (slmapp) message.

4. A method of positioning a terminal, the method comprising:
receiving, by a positioning center, a positioning parameter set from positioning equipment,
wherein the positioning parameter set comprises multipath information of the terminal,
wherein an equivalent line of sight (LOS) path information of the terminal is determined by combining, into the positioning parameter set, multipath information of a plurality of reference terminals,
wherein the combining includes a clustering process carried out on a multipath feature library,
wherein the multipath feature library comprises stored multipath information of the plurality of reference terminals and the multi-path information of the terminal to be positioned,
wherein the multipath information includes a measurement value associated with each of a plurality of different transmission paths,
wherein each of the plurality of different paths is a path through which a reference signal, sent by the terminal to be positioned or one of the reference terminals, reaches a positioning device,
wherein the measurement value associated with each path of the plurality of different transmission paths includes a measurement value obtained by the positioning device measuring the reference signal transmitted through the path,
wherein the measurement value includes one or more of an arrival azimuth angle measurement value, an arrival zenith angle measurement value, an arrival time measurement value, or an arrival angle measurement value,
wherein the positioning parameter set includes equivalent LOS path information of the terminal to be positioned,
wherein the equivalent LOS path is a straight transmission path from the terminal to be positioned to the positioning device, and
wherein the equivalent LOS path information of the terminal to be positioned includes one or more of an arrival azimuth angle of the equivalent LOS path, an arrival zenith angle of the equivalent LOS path, arrival time of the equivalent LOS path, or an arrival angle of the equivalent LOS path, which are determined according to the multipath information of the terminal to be positioned, the multipath information of the multiple reference terminals, and a cost equation; and
returning, by the positioning center, a response to the positioning equipment, wherein the response indicates the positioning center has received the positioning parameter set.

5. The method of claim 4, further comprising:
sending, by the positioning center, a positioning information measurement request to the positioning device, wherein the positioning information measurement request is used to request the positioning device to obtain the positioning parameter set.

6. The method of claim 4, wherein the set of positioning parameters is carried in a new air interface positioning protocol copy (NRPPa) message or an evolved serving mobile positioning center (ECMSC) location measurement unit (SLmAP) message.

7. A positioning device comprising:
a transceiver; and
a processor configured to acquire a positioning parameter set comprising multipath information of a terminal to be positioned,
wherein an equivalent line of sight (LOS) path information of the terminal is determined by combining, into the positioning parameter set, multipath information of a plurality of reference terminals, the multipath information of the terminal and multipath information of a plurality of reference terminals,
wherein the combining includes a clustering process carried out on a multipath feature library,
wherein the multipath feature library comprises stored multipath information of the plurality of reference terminals and the multipath information of the terminal to be positioned,
wherein the multipath information includes a measurement value associated with each of a plurality of different transmission paths,
wherein each of the plurality of different transmission paths is a path through which a reference signal, sent by the terminal to be positioned or one of the reference terminals, reaches the positioning device,
wherein the measurement value associated with each path of the plurality of different transmission paths includes a measurement value obtained by the positioning device measuring the reference signal transmitted through the respective transmission path,
wherein the measurement value associated with each path of the plurality of different transmission paths includes a measurement value obtained by the positioning device measuring the reference signal transmitted through the respective transmission path,
wherein the measurement value includes one or more of an arrival azimuth angle measurement value, an arrival zenith angle measurement value, an arrival time measurement value, or an arrival angle measurement value,
wherein the positioning parameter set includes equivalent LOS path information of the terminal to be positioned,
wherein the equivalent LOS path is a straight transmission path from the terminal to be positioned to the positioning device, and
wherein the equivalent LOS path information of the terminal to be positioned comprises one or more of an arrival azimuth angle of the equivalent LOS path, an arrival zenith angle of the equivalent LOS path, arrival time of the equivalent LOS path or an arrival angle of the equivalent LOS path, which are determined according to the multipath information of the terminal to be positioned, the multipath information of the multiple reference terminals and a cost equation; and the transceiver is configured to send the positioning parameter set to a positioning center.

8. The positioning device of claim 7, wherein the transceiver is further configured to receive a positioning information measurement request from the positioning center, wherein the positioning information measurement request is used to request the positioning device to acquire the positioning parameter set.

9. The positioning device of claim 7, wherein the set of positioning parameters is carried in a new air interface positioning protocol copy (NRPPa) message or an evolved serving mobile positioning center (EPS) location measurement unit (LMAP) application protocol (SLmAP) message.

10. A positioning center comprising:
a transceiver; and
a processor configured for receiving a positioning parameter set from positioning equipment through the transceiver,
  wherein the positioning parameter set comprises multipath information of a terminal to be positioned,
  wherein an equivalent line of sight (LOS) path information of the terminal is determined by combining, into the positioning parameter set, multipath information of a plurality of reference terminals, the multipath information of the terminal and multipath information of a plurality of reference terminals,
  wherein the combining includes a clustering process carried out on a multipath feature library,
  wherein the multipath feature library comprises stored multipath information of the plurality of reference terminals and the multipath information of the terminal to be positioned,
  wherein the multipath information includes a measurement value associated with each of a plurality of different transmission paths,
  wherein each of the plurality of different transmission paths is a path through which a reference signal, sent by the terminal to be positioned or one of the reference terminals, reaches the positioning device,
  wherein the measurement value associated with each path of the plurality of different transmission paths includes a measurement value obtained by the positioning device measuring the reference signal transmitted through the respective transmission path,
  wherein the measurement value associated with each path of the plurality of different transmission paths includes a measurement value obtained by the positioning device measuring the reference signal transmitted through the respective transmission path,
  wherein the measurement value includes one or more of an arrival azimuth angle measurement value, an arrival zenith angle measurement value, an arrival time measurement value, or an arrival angle measurement value,
  wherein the positioning parameter set includes equivalent LOS path information of the terminal to be positioned,
  wherein the equivalent LOS path is a straight transmission path from the terminal to be positioned to the positioning device, and
  wherein the equivalent LOS path information of the terminal to be positioned includes one or more of an arrival azimuth angle of the equivalent LOS path, an arrival zenith angle of the equivalent LOS path, arrival time of the equivalent LOS path, or an arrival angle of the equivalent LOS path, which are determined according to the multipath information of the terminal to be positioned, the multipath information of the multiple reference terminals, and a cost equation; and the processor is further configured to return a response to positioning equipment through the transceiver, where the response is used to indicate that the positioning center has received the positioning parameter set.

11. The positioning center of claim 10, wherein the processor is further configured to send a positioning information measurement request to the positioning device through the transceiver, wherein the positioning information measurement request is used to request the positioning device to obtain the positioning parameter set.

12. The positioning center of claim 10, wherein the set of positioning parameters is carried in a new air interface positioning protocol copy (NRPPa) message or an evolved serving mobile positioning center (ECMSCES) location measurement unit (SLmAP) message.

* * * * *